US012694881B2

(12) United States Patent
Svedberg et al.

(10) Patent No.: US 12,694,881 B2
(45) Date of Patent: *Jul. 28, 2026

(54) METHODS, ENCODER AND DECODER FOR HANDLING ENVELOPE REPRESENTATION COEFFICIENTS

(71) Applicant: Telefonaktiebolaget LM Ericsson (publ), Stockholm (SE)

(72) Inventors: Jonas Svedberg, Luleå (SE); Stefan Bruhn, Sollentuna (SE); Martin Sehlstedt, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 145 days.

This patent is subject to a terminal disclaimer.

(21) Appl. No.: 18/649,620

(22) Filed: Apr. 29, 2024

(65) Prior Publication Data

US 2024/0395268 A1 Nov. 28, 2024

Related U.S. Application Data

(63) Continuation of application No. 17/821,344, filed on Aug. 22, 2022, now Pat. No. 11,990,145, which is a (Continued)

(51) Int. Cl.
*G10L 19/08* (2013.01)
*G10L 19/02* (2013.01)

(Continued)

(52) U.S. Cl.
CPC ........ *G10L 19/0212* (2013.01); *G10L 19/038* (2013.01); *G10L 2019/0002* (2013.01)

(58) Field of Classification Search
CPC ..... G10L 19/08; G10L 19/032; G10L 19/167; G10L 25/18
See application file for complete search history.

(56) References Cited

U.S. PATENT DOCUMENTS 4,912,764 A * 3/1990 Hartwell ................. G10L 19/10 704/207
9,009,036 B2 * 4/2015 Valin ..................... G10L 19/038 704/229

(Continued)

FOREIGN PATENT DOCUMENTS

CN 101180676 5/2008
CN 101185127 A 5/2008

(Continued)

OTHER PUBLICATIONS

Peter Kabal, et al., "The Computation of Line Spectral Frequencies Using Chebyshev Polynomials", IEEE Transactions on Acoustics, Speech, and Signal Processing, vol. ASSP-34, No. 6, Dec. 1986, 8 pages.

(Continued)

*Primary Examiner* — Daniel Abebe
(74) *Attorney, Agent, or Firm* — Rothwell, Figg, Ernst & Manbeck, P.C.

(57) ABSTRACT

A method performed by an encoder. The method comprises determining envelope representation residual coefficients as first compressed envelope representation coefficients subtracted from the input envelope representation coefficients. The method comprises transforming the envelope representation residual coefficients into a warped domain so as to obtain transformed envelope representation residual coefficients. The method comprises applying, at least one of a plurality of gain-shape coding schemes on the transformed envelope representation residual coefficients in order to achieve gain-shape coded envelope representation residual coefficients, where the plurality of gain-shape coding schemes have mutually different trade-offs in one or more of gain resolution and shape resolution for one or more of the transformed envelope representation residual coefficients. The method comprises transmitting, over a communication (Continued)

channel to a decoder, a representation of the first compressed envelope representation coefficients, the gain-shape coded envelope representation residual coefficients, and information on the at least one applied gain-shape coding scheme.

25 Claims, 8 Drawing Sheets

Related U.S. Application Data continuation of application No. 16/783,823, filed on Feb. 6, 2020, now Pat. No. 11,430,455, which is a continuation of application No. 15/774,535, filed as application No. PCT/EP2017/082951 on Dec. 15, 2017, now Pat. No. 10,580,422.

(60) Provisional application No. 62/583,791, filed on Nov. 9, 2017, provisional application No. 62/435,173, filed on Dec. 16, 2016.

(51) Int. Cl.

| | |
|---|---|
| ***G10L 19/038*** | (2013.01) |
| *G10L 19/00* | (2013.01) |

(56) References Cited

U.S. PATENT DOCUMENTS

| | | | | |
|---|---|---|---|---|
| 9,111,535 | B2 | 8/2015 | Yang et al. | |
| 10,147,435 | B2 * | 12/2018 | Norvell | G10L 19/028 |
| 2004/0176951 | A1 | 9/2004 | Sung et al. | |
| 2005/0149339 | A1 | 7/2005 | Tanaka et al. | |
| 2006/0136202 | A1 * | 6/2006 | Sengupta | G10L 19/12 704/E19.035 |
| 2006/0271356 | A1 | 11/2006 | Vos | |
| 2008/0312915 | A1 * | 12/2008 | Den Brinker | G10L 19/06 704/E19.024 |
| 2010/0228557 | A1 | 9/2010 | Chen et al. | |
| 2010/0284455 | A1 | 11/2010 | Yamanashi et al. | |
| 2012/0290295 | A1 | 11/2012 | Eksler | |
| 2012/0323582 | A1 | 12/2012 | Peng et al. | |
| 2014/0025375 | A1 | 1/2014 | Norvell | |
| 2016/0088297 | A1 | 3/2016 | Svedberg | |
| 2019/0279651 | A1 * | 9/2019 | Svedberg | G10L 19/038 |
| 2020/0402519 | A1 | 12/2020 | Olivieri | |
| 2020/0402523 | A1 | 12/2020 | Olivieri | |

FOREIGN PATENT DOCUMENTS

| | | |
|---|---|---|
| CN | 101588182 | 11/2009 |
| CN | 102222505 A | 10/2011 |

OTHER PUBLICATIONS

Jianping Pan, “Two-Stage Vector Quantization—Pyramidal Lattice Vector Quantization and Application To Speech LSP Coding”, IEEE, (1995), 4 pages.

3GPP, 3rd Generation Partnership Project; Technical Specification Group Services and System Aspects; Mandatory Speech Codec speech processing functions; Adaptive Multi-Rate (AMR) speech codec; Transcoding functions, (Release 13), 3GPP TS 26.090, V13.0.0, (Dec. 2015), 55 pages.

John Makhoul, “Linear Prediction: A Tutorial Review”, Proceedings of the IEEE, vol. 63, No. 4, (Apr. 1975), 20 pages.

Jianping Pan, “Extension of Two-Stage Vector Quantization—Lattice Vector Quantization”, IEEE Transactions on Communications, vol. 45, No. 12, (Dec. 1997), 10 pages.

J.M. Valin, et al., Request for Comments (RFC) 6716, “Definition of the Opus Audio Codec”, Internet Engineering Task Force (IETF), Standards Track, (Sep. 2012), 327 pages.

International Telecommunication Union, ITU-T, G.719, Series G: Transmission Systems and Media, Digital Systems and Networks, Digital terminal equipments—Coding of analogue signals, Low-complexity, full-band audio coding for high-quality, conversational applications, (Jun. 2008), 58 pages.

International Telecommunication Union, ITU-T, G.711, General Aspects of Digital Transmission Systems, Terminal Equipments, Pulse Code Modulation (PCM) of Voice Frequencies, (Extract from the Blue Book), (1988, 1993), 12 pages.

Naoki Iwakami, et al., “High-Quality Audio-Coding at Less Than 64 KBIT/S by Using Transform-Doman Weighted Interleave Vector Quantization (TWINVQ)”, IEEE, (1995), 4 pages.

Adriana Vasilache, et al., “Flexible Spectrum Coding in the 3GPP EVS Codec”, IEEE, ICASSP, (2015), 5 Pages.

International Search Report and Written Opinion issued in International Application No. PCT/EP2017/082951, dated Jan. 30, 2018, 11 pages.

* cited by examiner

METHODS, ENCODER AND DECODER FOR HANDLING ENVELOPE REPRESENTATION COEFFICIENTS

CROSS-REFERENCE TO RELATED APPLICATIONS

This application is a continuation of U.S. application Ser. No. 17/821,344, filed on 2022 Aug. 22 (now U.S. Pat. No. 11,990,145, issued on 2024 May 21), which is a continuation of U.S. application Ser. No. 16/783,823, filed on 2020 Feb. 6 (now U.S. Pat. No. 11,430,455, issued on 2022 Aug. 30), which is a continuation of U.S. application Ser. No. 15/774,535, having a section 371 (c) date of 2018 May 8 (now U.S. Pat. No. 10,580,422 issued on 2020 Mar. 3), which is the U.S. National Stage application of International patent application no. PCT/EP2017/082951, filed on 2017 Dec. 15, which claims priority to: i) U.S. provisional application No. 62/583,791, filed on 2017 Nov. 9 and ii) U.S. provisional patent application No. 62/435,173, filed on 2016 Dec. 16. The above identified applications are incorporated by this reference.

TECHNICAL FIELD

The present embodiments generally relate to speech and audio encoding and decoding, and in particular to handling of envelope representation coefficients.

BACKGROUND

When handling audio signals, such as speech signals, at an encoder of a transmitting unit, the audio signals are represented digitally in a compressed form using for example Linear Predictive Coding, LPC. As LPC coefficients are sensitive to distortions, which may occur to a signal transmitted in a communication network from a transmitting unit to a receiving unit, the LPC coefficients might be transformed to envelope representation coefficients at the encoder. Further, the envelope representation coefficients may be compressed, i.e. coded, in order to save bandwidth over the communication interface between the transmitting unit and the receiving unit.

A further use of the spectral envelope is to apply a mean removed normalized frequency envelope to scale a frequency domain signal prior to quantization, based on a quantized spectral envelope in order to control the frequency location and magnitude of the spectral line quantization errors introduced in the spectral line quantization for those frequency locations. The mean removed normalized frequency envelope may be represented as a vector of scale factors.

LSF coefficients provide a compact representation of a spectral envelope, especially suited for speech signals. LSF coefficients are used in speech and audio coders to represent and transmit the envelope of the signal to be coded. The LSFs are a representation typically based on linear prediction. The LSFs comprise an ordered set of angles in the range from 0 to pi, or equivalently a set of frequencies from 0 to Fs/2, where Fs is the sampling frequency of the time domain signal. The LSF coefficients can be quantized on the encoder side and are then sent to the decoder side. LSF coefficients are robust to quantization errors due to their ordering property. As a further benefit, the input LSF coefficient values are easily used to weigh the quantization error for each individual LSF coefficient, a weighing principle which coincides well with a wish to reduce the codec quantization error more in perceptually important frequency areas than in less important areas.

Legacy methods, such as AMR-WB (Adaptive Multi-Rate Wide Band), use a large stored codebook or several medium sized codebooks in several stages, such as Multistage Vector Quantizer (MSVQ) or Split MSVQ, for LSF, or Immittance Spectral Frequencies (ISF), quantization, and typically make an exhaustive search in codebooks that is computationally costly.

Alternatively, an algorithmic VQ can be used, e.g. in EVS (Enhanced Voice Service) a scaled $D8^+$ lattice VQ is used which applies a shaped lattice to encode the LSF coefficients. The benefit of using a structured lattice VQ is that the search in codebooks may be simplified and the storage requirements for codebooks may be reduced, as the structured nature of algorithmic Lattice VQs can be used. Other examples of lattices are D8, RE8. In some EVS mode of operation, Trellis Coded Quantization, TCQ, is employed for LSF quantization. TCQ is also a structured algorithmic VQ.

There is an interest to achieve an efficient compression technique requiring low computational complexity at the encoder.

SUMMARY

An object of embodiments herein is to provide efficient compression requiring low computational complexity at the encoder.

According to a first aspect there is presented a method performed by an encoder of a communication system for handling input envelope representation coefficients. The method comprises determining envelope representation residual coefficients as first compressed envelope representation coefficients subtracted from the input envelope representation coefficients. The method comprises transforming the envelope representation residual coefficients into a warped domain so as to obtain transformed envelope representation residual coefficients. The method comprises applying, at least one of a plurality of gain-shape coding schemes on the transformed envelope representation residual coefficients in order to achieve gain-shape coded envelope representation residual coefficients, where the plurality of gain-shape coding schemes have mutually different trade-offs in one or more of gain resolution and shape resolution for one or more of the transformed envelope representation residual coefficients. The method comprises transmitting, over a communication channel to a decoder, a representation of the first compressed envelope representation coefficients, the gain-shape coded envelope representation residual coefficients, and information on the at least one applied gain-shape coding scheme.

According to a second aspect there is presented an encoder for handling input envelope representation coefficients. The encoder comprises processing circuitry configured to perform the method according to the first aspects.

According to an embodiment the encoder further comprises a storage medium storing a set of operations as defined by the actions performed by the encoder according to the first aspect. The processing circuitry is configured to retrieve the set of operations from the storage medium to cause the encoder to perform the set of operations.

According to a third aspect there is presented an encoder for handling input envelope representation coefficients. The encoder comprises modules configured to perform the method according to the first aspects.

According to a fourth aspect there is presented a computer program for handling input envelope representation coefficients, the computer program comprising computer program code which, when run on processing circuitry of an encoder, causes the encoder to perform a method according to the first aspect.

According to a fifth aspect there is presented a method performed by a decoder of a communication system for handling envelope representation residual coefficients. The method comprises receiving, over a communication channel from an encoder, a representation of first compressed envelope representation coefficients, gain-shape coded envelope representation residual coefficients, and information on at least one applied gain-shape coding scheme, applied by the encoder. The method comprises applying, at least one of a plurality of gain-shape decoding schemes on the received gain-shape coded envelope representation residual coefficients according to the received information on at least one applied gain-shape coding scheme, in order to achieve envelope representation residual coefficients, where the plurality of gain-shape decoding schemes have mutually different trade-offs in one or more of gain resolution and shape resolution for one or more of the gain-shape coded envelope representation residual coefficients. The method comprises transforming the envelope representation residual coefficients from a warped domain into an envelope representation original domain so as to obtain transformed envelope representation residual coefficients. The method comprises determining envelope representation coefficients as the transformed envelope representation residual coefficients added with the received first compressed envelope representation coefficients.

According to a sixth aspect there is presented a decoder for handling envelope representation residual coefficients. The decoder comprises processing circuitry configured to perform the method according to the fifth aspects.

According to an embodiment the decoder further comprises a storage medium storing a set of operations as defined by the actions performed by the decoder according to the fifth aspect. The processing circuitry is configured to retrieve the set of operations from the storage medium to cause the decoder to perform the set of operations.

According to a seventh aspect there is presented a decoder for handling input envelope representation coefficients. The decoder comprises modules configured to perform the method according to the fifth aspects.

According to an eight aspect there is presented a computer program for handling envelope representation residual coefficients, the computer program comprising computer program code which, when run on processing circuitry of a decoder, causes the decoder to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent embodiments as well as from the drawings.

Generally, all terms used in the enumerated embodiments are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. The figures are schematic and simplified for clarity, and they merely show details for the understanding of the embodiments presented herein, while other details have been left out.

Figure 1:
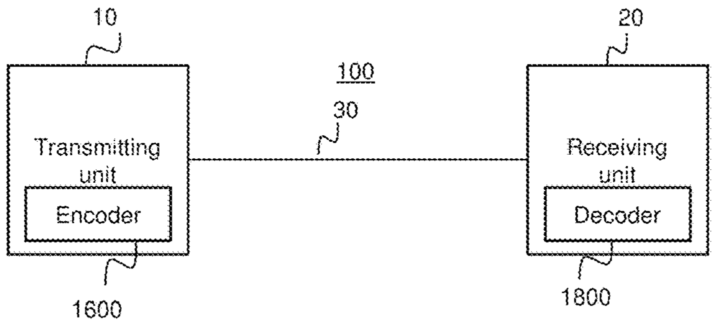
FIG. 1 shows a communication network comprising a transmitting unit and a receiving unit.

FIG. 1 shows a communication network 100 comprising a transmitting unit 10 and a receiving unit 20. The transmitting unit 10 is operatively connected to the receiving unit 20 via a communication channel 30. The communication channel 30 may be a direct connection or an indirect connection via one or more routers or switches. The communication channel 30 may be through a wireline connection, e.g. via one or more optical cables or metallic cables, or through a wireless connection, e.g. a direct wireless connection or a connection via a wireless network comprising more than one link. The transmitting unit 10 comprises an encoder 1600. The receiving unit 20 comprises a decoder 1800.

Figure 2:
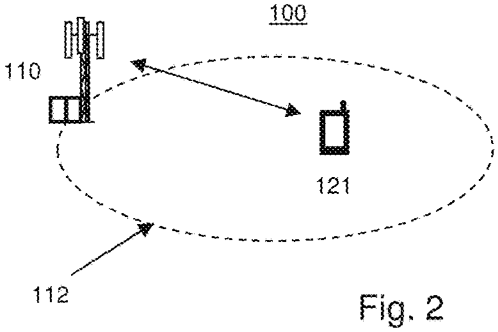
FIG. 2 shows an exemplary wireless communications network in which embodiments herein may be implemented.

FIG. 2 depicts an exemplary wireless communications network 100 in which embodiments herein may be implemented. The wireless communications network 100 may be a wireless communications network such as an LTE (Long Term Evolution), LTE-Advanced, Next Evolution, WCDMA (Wideband Code Division Multiple Access), GSM/EDGE (Global System for Mobile communications/Enhanced Data rates for GSM Evolution), UMTS (Universal Mobile Telecommunication System) or WiFi (Wireless Fidelity), or any other similar cellular network or system.

The wireless communications network 100 comprises a network node 110. The network node 110 serves at least one cell 112. The network node 110 may be a base station, a radio base station, a nodeB, an eNodeB, a Home Node B, a Home eNode B or any other network unit capable of communicating with a wireless device within the cell 112 served by the network node depending e.g. on the radio access technology and terminology used. The network node may also be a base station controller, a network controller, a relay node, a repeater, an access point, a radio access point, a Remote Radio Unit, RRU, or a Remote Radio Head, RRH.

In FIG. 2, a wireless device 121 is located within the first cell 112. The device 121 is configured to communicate within the wireless communications network 100 via the network node 110 over a radio link, also called wireless communication channel, when present in the cell 112 served by the network node 110. The wireless device 121 may e.g. be any kind of wireless device such as a mobile phone, cellular phone, Personal Digital Assistants, PDA, a smart phone, tablet, sensor equipped with wireless communication abilities, Laptop Mounted Equipment, LME, e.g. USB, Laptop Embedded Equipment, LEE, Machine Type Communication, MTC, device, Machine to Machine, M2M, device, cordless phone, e.g. DECT (Digital Enhanced Cordless Telecommunications) phone, or Customer Premises Equipment, CPEs, etc. In embodiments herein, the mentioned encoder 1600 may be situated in the network node 110 and the mentioned decoder 1800 may be situated in the wireless device 121, or the encoder 1600 may be situated in the wireless device 121 and the decoder 1800 may be situated in the network node 110.

Figure 3:
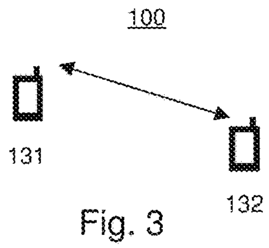
FIG. 3 shows an exemplary communication network comprising a first and a second short-range radio enabled communication devices.

Embodiments described herein may also be implemented in a short-range radio wireless communication network such as a Bluetooth based network. In a short-range radio wireless communication network communication may be performed between different short-range radio communication enabled communication devices, which may have a relation such as the relation between an access point/base station and a wireless device. However, the short-range radio enabled communication devices may also be two wireless devices communicating directly with each other, leaving the cellular network discussion of FIG. 2 obsolete. FIG. 3 shows an exemplary communication network 100 comprising a first and a second short-range radio enabled communication devices 131, 132 that communicate directly with each other via a short-range radio communication channel. In embodiments described herein, the mentioned encoder 1600 may be situated in the first short-range radio enabled communication device 131 and the mentioned decoder 1800 may be situated in the second short-range radio enabled communication device 132, or vice versa. Naturally both communication devices comprise an encoder as well as a decoder to enable two-way communication.

Alternatively, the communication network may be a wireline communication network.

As part of the developing of the embodiments described herein, a problem will first be identified and discussed.

When transmitting envelope representation coefficients from a transmitting unit comprising an encoder to a receiving unit comprising a decoder there is an interest to achieve a better compression technique, requiring low bandwidth for transmitting the signal and low computational complexity at the encoder and the decoder.

According to one embodiment, such a problem may be solved by a method performed by an encoder of a communication system for handling input envelope representation coefficients as presented above.

Figure 4:
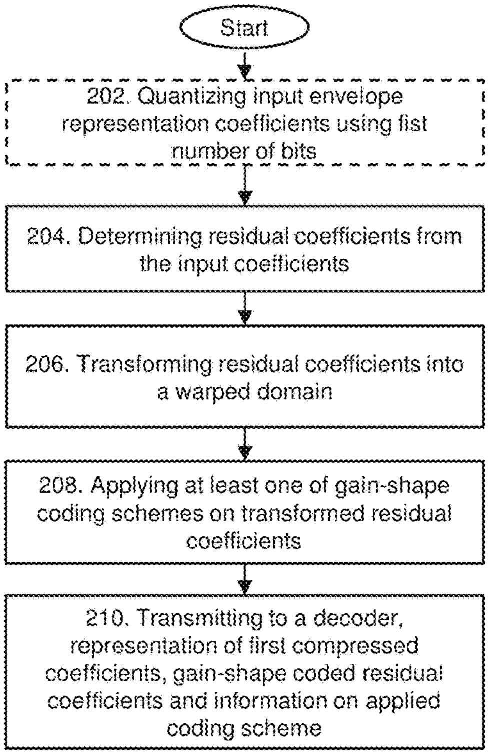
FIG. 4 illustrates an example of actions that may be performed by an encoder.

FIG. 4 is an illustrated example of actions or operations that may be taken or performed by an encoder, or by a transmitting unit comprising the encoder. In the disclosure, the "encoder" may correspond to "a transmitting unit comprising an encoder". The method of the example shown in FIG. 4 may comprise one or more of the following actions:

Action 202. Quantize the input envelope representation coefficients using a first number of bits.

Action 204. Determine envelope representation residual coefficients as first compressed envelope representation coefficients subtracted from the input envelope representation coefficients.

Action 206. Transform the envelope representation residual coefficients into a warped domain so as to obtain transformed envelope representation residual coefficients.

Action 208. Apply at least one of a plurality of gain-shape coding schemes on the transformed envelope representation residual coefficients in order to achieve gain-shape coded envelope representation residual coefficients, where the plurality of gain-shape coding schemes have mutually different trade-offs in one or more of gain resolution and shape resolution for one or more of the transformed envelope representation residual coefficients.

Action 210. Transmit, over a communication channel to a decoder, a representation of the first compressed envelope representation coefficients, the gain-shape coded envelope representation residual coefficients, and information on the at least one applied gain-shape coding scheme.

According to one embodiment, such a problem may be solved by a method performed by an decoder of a communication system for handling envelope representation residual coefficients as presented above.

Figure 5:
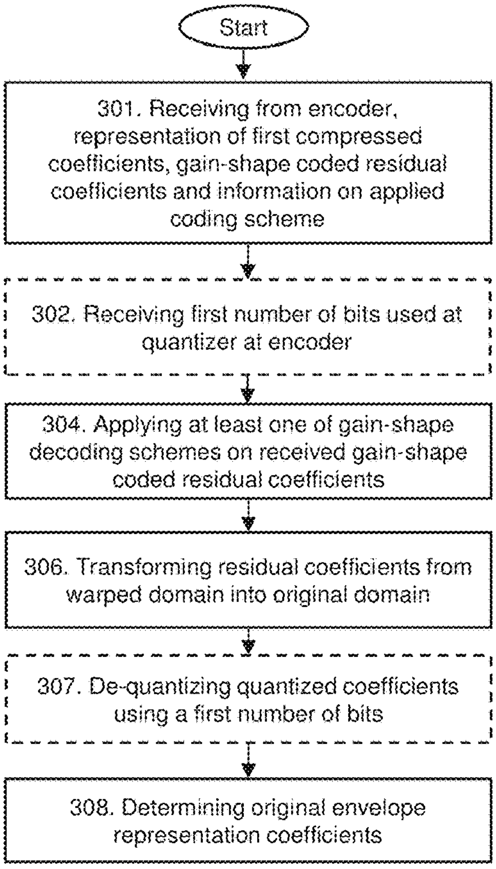
FIG. 5 illustrates an example of actions that may be performed by a decoder.

FIG. 5 is an illustrated example of actions or operations that may be taken or performed by a decoder, or by a receiving unit comprising the decoder. In the disclosure, the "decoder" may correspond to "a receiving unit comprising a decoder". The method of the example shown in FIG. 5 may comprise one or more of the following actions:

Action 301. Receive, over a communication channel from an encoder (1600), a representation of first compressed envelope representation coefficients, gain-shape coded envelope representation residual coefficients, and information on at least one applied gain-shape coding scheme, applied by the encoder.

Action 302. Receive, over the communication channel and from the encoder, the first number of bits used at a quantizer of the encoder.

Action 304. Apply at least one of a plurality of gain-shape decoding schemes on the received gain-shape coded envelope representation residual coefficients according to the received information on at least one applied gain-shape coding scheme, in order to achieve envelope representation residual coefficients, where the plurality of gain-shape decoding schemes have mutually different trade-offs in one or more of gain resolution and shape resolution for one or more of the gain-shape coded envelope representation residual coefficients.

Action 306. Transform the envelope representation residual coefficients from a warped domain into an envelope representation original domain so as to obtain transformed envelope representation residual coefficients.

Action 307. De-the quantize envelope representation coefficients using a first number of bits corresponding to the number of bits used for quantizing envelope representation coefficients at a quantizer of the encoder.

Action 308. Determine envelope representation coefficients as the transformed envelope representation residual coefficients added with the received first compressed envelope representation coefficients.

According to some embodiments, the encoder performs the following actions:

The encoder applies a low bit rate first stage quantizer to the mean removed envelope representation coefficients, resulting in envelope representation residual coefficients. A lower bitrate requires smaller storage than a bitrate that is higher than the low bitrate. The mean removed envelope representation coefficients are input envelope representation coefficients with the mean value removed.

The encoder transforms the envelope representation residual coefficients to a warped domain (e.g applying Hadamard transform, Rotated DCT transform, or DCT transform.

The encoder selectively applies at least one of a plurality of submode gain-shape coding schemes of the transformed envelope representation residual coefficients, where the submode schemes have different trade-offs in gain resolution and/or resolution for the shape of the coefficients (i.e. across the transformed envelope representation residual coefficients).

The gain-shape submodes may use different resolution (in bits/coefficient) for different subsets. Examples of subsets {A/B}: {even+last}/{odd-last} Hadamard coefficients, DCT{0-9} and DCT{10-15}. An outlier mode may have one single full set of all the coefficients in the residual, whereas the regular mode may have several, or restricted, subsets, covering different dimensions with differing resolutions (bits/coefficient).

In some examples, the submode scheme selection is made by a combination of low complex Pyramid Vector Quantizer-, PVQ-projection and shape fine search selection followed by an optional global mean square error, MSE, optimization. The MSE optimization is global in the sense that both gain and shape and all submodes are evaluated. This saves average complexity. The action results in a submode index and possibly a gain codeword, and shape code word(s) for the selected submode. The selectively applying may be realized by searching an initial outlier submode and subsequently a non-outlier mode.

In some examples the gain-shape sub-mode selection is made by a combination of low complex Pyramid VQ (PVQ) shape fine search selection and then an optional global (mean square error) MSE optimization (global in the sense that both gain and shape and all submodes are evaluated). This saves average complexity and results in a shape-gain submode index j and possibly a gain codeword i, and shape code word(s) for the selected shape-gain submode j.

In some examples the encoder searches an initial outlier submode and eventually a non-outlier mode.

In some examples the encoder sends first stage VQ codewords over the channel to the decoder.

In some examples the encoder sends high level submode-information over the channel to the decoder.

In some examples the encoder combines gain codeword (s) with the shape index and send these over the channel to the decoder, if required by the selected gain-shape submode j.

In some examples the shape PVQ codeword(s) are indexed, optionally combined with a part of the gain codeword and/or a part of the submode index by the encoder, and sent by the encoder over the channel to the decoder.

By one or more of the embodiments of the invention one or more of the following advantages may be achieved:

Very low complexity can be achieved.

The application of a structured (energy compacting) transform allows for a strongly reduced first stage VQ. For example, the first stage VQ may be reduced to 25% of its original codebook size decreasing both Table ROM (Read Only Memory) and first stage search complexity. E.g. from R=0.875 bits/coefficient to R=0.625 bits per coefficient. E.g. with dimensions 8 the bit rate can be dropped from 8*0.875=7 bits to 8*0.625-5 bits, which corresponds to a drop from 128 vectors to 32 vectors of dimension 8.

The structured PVQ based sub-modes may be searched with an extended (low complex) linear search, even though there are several gain-shape combination sub-modes for the envelope representation coefficients available.

The structured PVQ based sub-modes may be optimized to handle both outliers, where outliers are the envelope representation residual coefficients with an atypical high and low energy, and also handle non-outlier target vectors with sufficient resolution.

In the following, an embodiment is presented. The proposed method requires as input a vector of envelope representation coefficients.

Encoder Side Envelope Determination of Target Scale Factors

Figure 10:
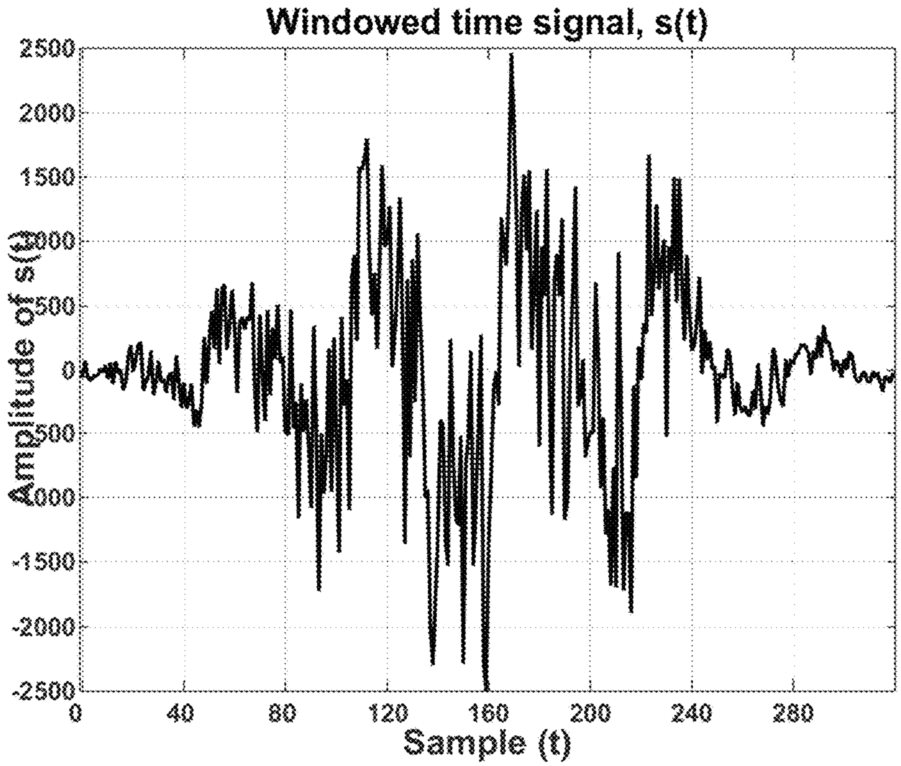
FIG. 10 shows an example of a time domain signal.
Figure 11:
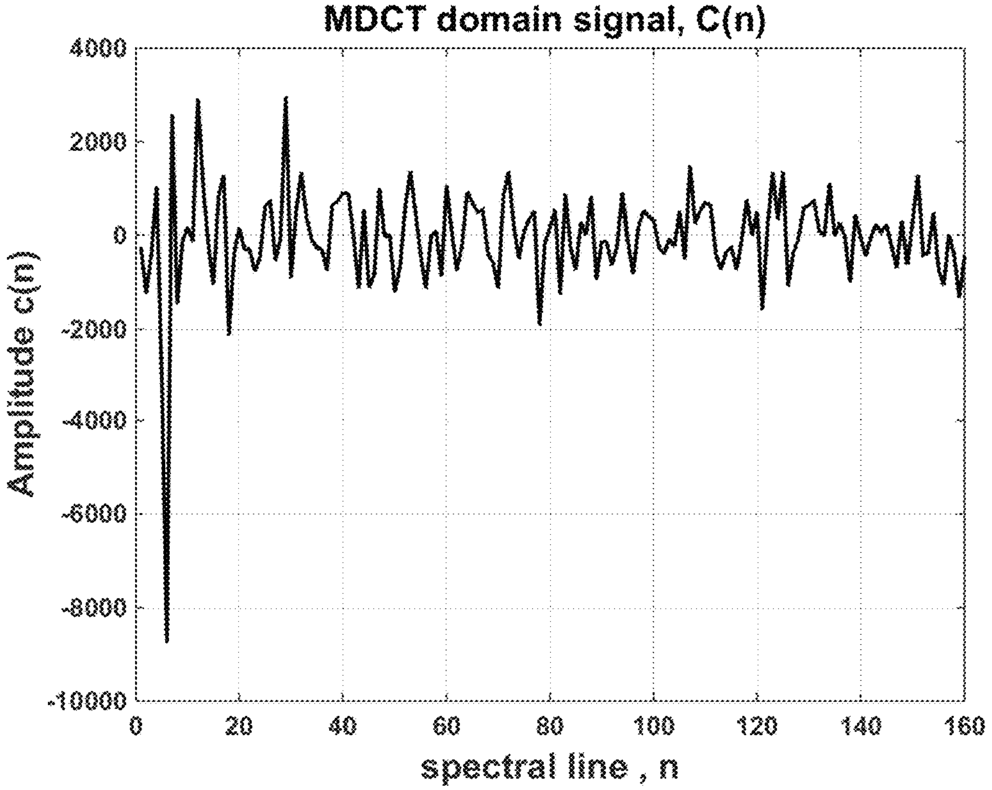
FIG. 11 shows an example of an MDCT domain signal of the time signal in FIG. 10.

FIG. 10 depicts an example of a time domain signal s(t). The example shown is 20 ms of a 16 kHz sampled signal. In general terms, the time signal s(t) is transformed into a frequency domain signal using the known MDCT transform, where component n of the frequency domain signal is denoted c(n) and is determined according to: c(n)=MDCT (s(t)). FIG. 11 shows the spectral coefficients c(n) (also known as spectral lines) obtained for the time signal in FIG. 10.

In some aspects the time signal is an audio signal, such as a speech signal. An analysis window might be applied before the MDCT, see e.g. MDCT application and definition in ITU-T G.719 encoder. The spectral coefficients c(n) for n=0 . . . (Ncoded−1), where Ncoded may be e.g. 400 coefficients from the encoder side MDCT, are in this embodiment grouped into Nbands=16 uniform bands of length Lbands=Ncoded/16. The band sizes could alternatively be logarithmic or semi-logarithmic band sizes (as in aforementioned document ITU-T G.719)). The obtained logarithmic spectral band energies en Log(band) are normalized into a vector of target scale factors scf(band) by removing the mean of all en Log(band) values:

$$enLog(\text{band}) = \log_2\left(\frac{\sum_{n=start}^{start+L_{band}-1}(C_{in})^2}{L_{band}}\right), \quad (1)$$

$$\text{for start} = \{0, 1\cdot L_{band}, 2\cdot L_{band}, \ldots, (N_{bands}-1)\cdot L_{band}\}$$

$$scf(\text{band}) = \frac{enLog(band) - \frac{\sum_{n=0}^{N_{bands}-1} enlog(n)}{N_{bands}}}{2}, \quad (2)$$

$$\text{for band} = \{1 \ldots N_{bands}-1\}$$

Figure 12:
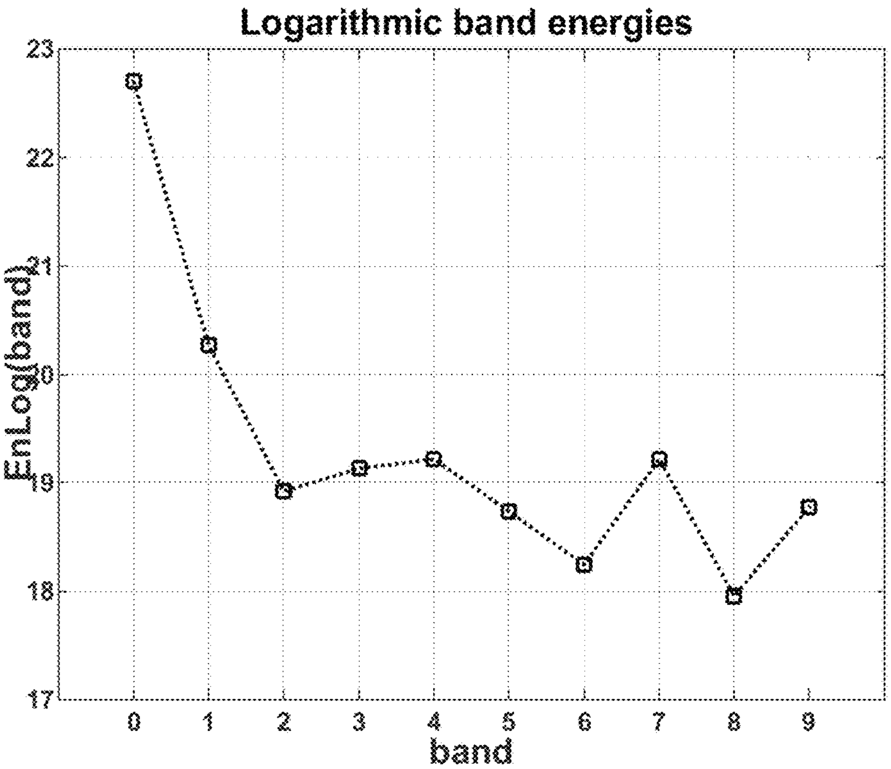
FIG. 12 shows logarithmic band energies of the MDCT domain signal in FIG. 11.
Figure 13:
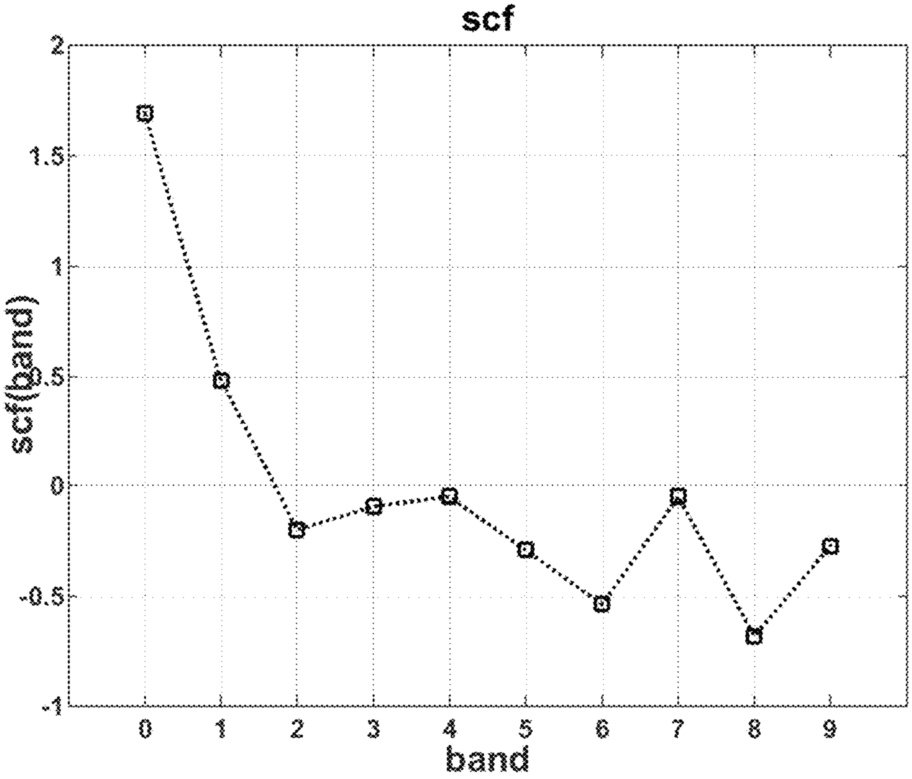
FIG. 13 shows envelope representation coefficients of the logarithmic band energies in FIG. 12.

These target scale factors scf(band) for band=0 . . . 15 now represents an approximation of the mean level normalized Root Mean Square (RMS) shape for the spectral envelope of the original time domain input signal s(t). FIG. 12 shows the logarithmic spectral band energies en Log(band) as obtained from the spectral coefficients c(n) according to Equation (1). FIG. 13 shows the scale factors scf(n) as obtained from the logarithmic spectral band energies en Log(band) according to Equation (2).

Encoder Side Scale Factor Quantization

General

The target scale factors scf(n) as obtained according the above are quantized using a two-stage vector quantizer employing a total of 38 bits (R=2.375 bits/coefficient). The first stage is a 10 bit split VQ and the second stage is a low complex algorithmic Pyramid VQ (PVQ). To maintain low overall VQ complexity the Pyramid VQ is analyzed in a gain/shape fashion in a transformed domain, enabling an efficient shape only search, followed by a low complex total MSE evaluation in a combined gain and shape determination step. The presented VQ-scheme can typically be realized in the range of 20-60 bits without any drastic increase in complexity with increased bit rate.

Figure 6:
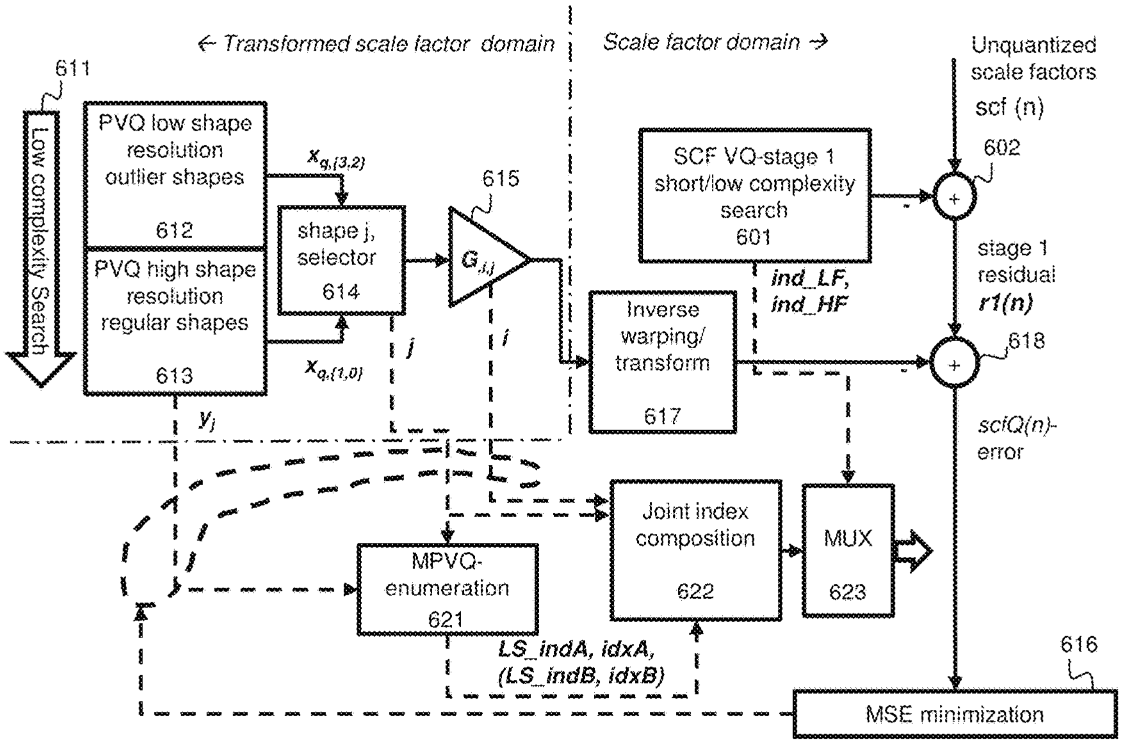
FIG. 6 illustrates an example of an encoder, with a generic MSE-minimization loop.
Figure 14:
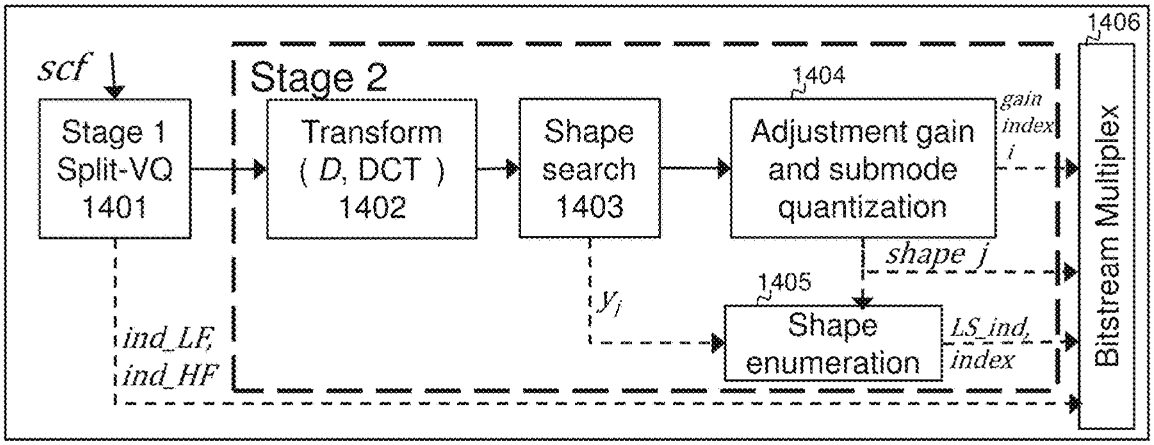
FIG. 14 illustrates an example of an encoder with gain and shape search in a transformed domain.

FIG. 14 schematically illustrates functional modules of an encoder employing the above disclosed stage 1 and stage 2 VQ. A complementary representation of this encoder is shown in FIG. 6.

Stage 1

The first stage is a split VQ employing two off-line trained stochastic codebooks LFCB and HFCB. Each codebook row has dimension 8 and the number of codebook columns is limited to 32, requiring 5 bits for each split for transmission. The MSE distortions for the two codebooks are defined as follows:

$$\text{dMSE\_LF}_i = \sum_{n=0}^{7}(scf(n) - LFCB_i(n))^2 \quad (3)$$

$$\text{dMSE\_HF}_i = \sum_{n=0}^{7}(scf(n+8) - HFCB_i(n))^2 \quad (4)$$

The best index for the low frequency split is found (module 601; SCF VQ-stage 1 short/low complexity search) according to:

$$\text{ind\_LF} = \underset{i=[0 \ldots 31]}{\text{argmin}}\ \text{dMSE\_LF}_i \quad (5)$$

The best index for the high frequency split is found (module 601; SCF VQ-stage 1 short/low complexity search) according to:

$$\text{ind\_HF} = \underset{i=[0 \ldots 31]}{\text{argmin}}\ \text{dMSE\_HF}_i \quad (6)$$

The first stage vector is composed as:

$$st1(n) = LFCB_{ind\_LF}(n), \quad (7)$$

$$\text{for } n = [0 \ldots 7],$$

$$st1(n+8) = HFCB_{ind\_HF}(n), \quad (8)$$

$$\text{for } n = [0 \ldots 7],$$

The first stage residual signal is calculated (module 602) as:

$$r1(n) = scf(n) - st1(n), \quad (9)$$

$$\text{for } n = [0 \ldots 15],$$

Stage 2 Gain-Shape VQ General Description

Figure 8:
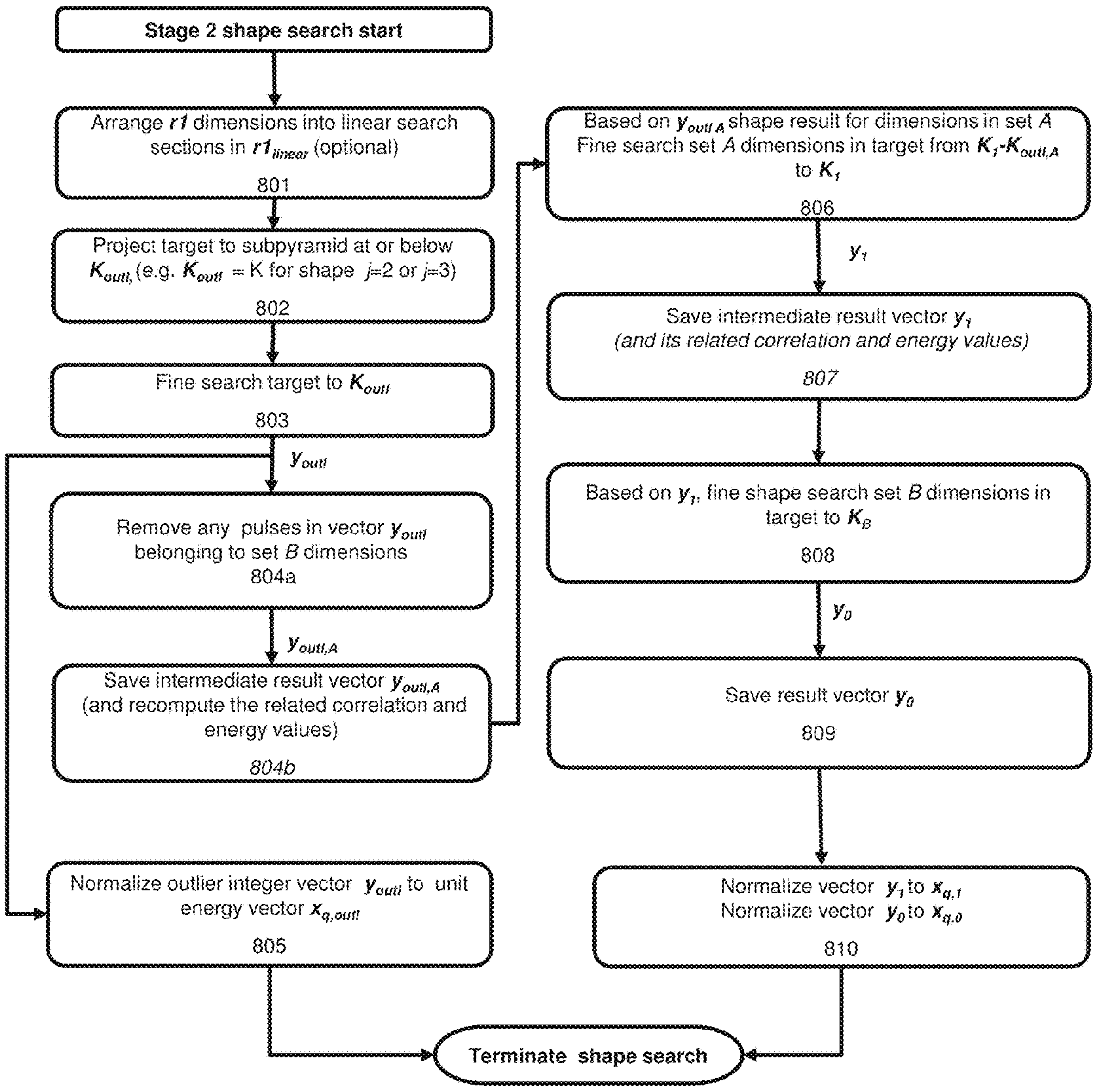
FIG. 8 is a flow chart illustration of an example embodiment of a stage 2 shape search flow.

Reference is made to FIG. 8 illustrating an example embodiment of a stage 2 shape search flow with actions 801-810:

- 801: Arrange r1 dimensions into linear search sections in $r1_{linear}$ (optional)
- 802: Project target to subpyramid at or below $K_{outl}$(e.g. $K_{outl}$=K for shape j=2 or j=3)
- 803: Fine search target to $K_{outl}$
- 804*a*: Remove any pulses in vector $y_{outl}$ belonging to set B dimensions
- 804*b*: Save intermediate result vector $y_{outl,A}$ (and recompute the related correlation and energy values)
- 805: Normalize outlier integer vector $y_{outl}$ to unit energy vector $x_{q,outl}$
- 806: Based on $y_{outl\ A}$ shape result for dimensions in set A. Fine search set A dimensions in target from $K_1-K_{outl,A}$ to $K_1$
- 807: Save intermediate result vector $y_1$ (and its related correlation and energy values)
- 808: Based on $y_1$, fine shape search set B dimensions in target to $K_B$
- 809: Save result vector $y_0$
- 810: Normalize vector $y_1$ to $x_{q,1}$, and normalize vector $y_0$ to $x_{q,0}$.

The corresponding modules in FIG. 6 are module 611 (overall direction), module 612 (outlier shapes), module 613 (regular shapes), where module 611 implements actions 801 through 810, and module 612 implements to actions 803 and 805, (however action 803 is run first with j=3 and then with j=2, and then the normalization action 805 is run for each j) as module 612 results in two outlier vectors).

On a high level the overall mean square error that is minimized (616) by the second stage is:

$$dMSE(shapeInd, gainInd, unitShapeIdxs) = \sum_{n=0}^{15} \left( r1(n) - G_{gainInd,shapeInd} \cdot \left[ x_{q,shape}(n, unitShapeIdxs) \cdot D^T \right] \right)^2, \quad (10)$$

where $G_{gainInd,shapeInd}$ is a scalar value, D is a 16-by-16 rotation matrix and $x_{q,shape}$ is a unit energy normalized vector of length 16. The shapeInd, gainInd, unitShapeIdxs indices results in a total of $2^{28}$ possible gain-shape combinations, the target of the second stage search is to find the set of indices that results in a minimum dMSE distortion value. In FIG. 6 this overall gain-shape MSE minimization and analysis is implemented by the normalized shape selector module 614, the adjustment gain application module 615, the subtraction module 618 and the MSE minimization module 616. The MSE minimization module 616 as depicted in FIG. 6 may also include varying the shapes $y_j$, (a unit energy normalized $y_j$, would be $x_{q,shape}$). This general error minimization loop indicated in FIG. 6 and by Equation 10 indicates that the MSE error is evaluated in the original scale factor domain, however given that the implemented analysis transform and synthesis transform is of high enough numerical precision the gain-shape MSE optimization may preferably be made in the transformed scale factor domain (See Equation 11, FIG. 14) to save encoder side processing complexity.

Stage 2 Transform

The second stage employs a 16-dimensional DCT-rotation using a 16-by-16 matrix D. The matrix D has been determined off-line for efficient scale factor quantization, it has the property that $D^T \cdot D = I$, where/is the identity matrix. To reduce the encoder side search complexity the reverse (i.e., analysis) transform D (i.e. DCT) may be used prior to the shape and gain determination, while on the decoder side only the forward (synthesis) transform $D^T$ (i.e. IDCT) is required. The coefficients of the full D rotation matrix are listed below. It should be noted that the conventional DCT( ) and IDCT( ) functions could be used to realize these transformations. Possible alternatives that also are able to handle a mean value component in the residual signal, are to use e.g the Hadamard transform with very low processing and storage requirements or even a trained Rotation Matrix. In FIG. 6 the move of a candidate signal from the transformed scale factor domain to the original scale factor domain is implemented by the synthesis transform module 617. FIG. 14 shows how the MSE-shape and gain search is preferably moved to the transformed domain by the analysis transform in module 1402, this is also explicitly shown in Equation 11.

Stage 2 Shape Candidates

There are four different 16-dimensional unit energy normalized shape candidates evaluated, where the normalization is always performed over 16 coefficients. The pulse configurations for two sets (denoted A and B) of scale factors for each candidate shape index(j) are given in Table 1.

TABLE 1

Scale factor VQ second stage shape candidate pulse configurations

| Shape index (j) | Shape name | Scale factor set A | Scale factor set B | Pulse configuration, Set A, PVQ($N_A$, $K_A$) | Pulse configuration, Set B, PVQ($N_B$, $K_B$) |
|---|---|---|---|---|---|
| 0 | 'regular' | {0, 1, 2, 3, 4, 5, 6, 7, 8, 9} | {10, 11, 12, 13, 14, 15} | PVQ(10, 10) | PVQ(6, 1) |
| 1 | 'regular_lf' | {0, 1, 2, 3, 4, 5, 6, 7, 8, 9} | {10, 11, 12, 13, 14, 15} | PVQ(10, 10) | Zeroed |
| 2 | 'outlier_near' | {0, 1, 2, 3, 4, 5, 6, 7, 8, 9, 10, 11, 12, 13, 14, 15} | Empty set | PVQ(16, 8) | Empty |
| 3 | 'outlier_far' | {0, 1, 2, 3, 4, 5, 6, 7, 8, 9, 10, 11, 12, 13, 14, 15} | Empty set | PVQ(16, 6) | Empty |

Shape index j=0 pulse configuration is a hybrid PVQ shape configuration, with $K_A$=10 over $N_A$=10 scale factors and $K_A$=1 over the remaining $N_B$=6 scale factors. For shape index 0, it the two sets of unit pulses are unit energy normalized over the full target dimension $N=N_A+N_B=16$, even though the PVQ integer pulse and sign enumeration is performed separately for each scale factor set.

Stage 2 Target Preparation

The shape search target preparation consists of a 16×16 dimensional matrix analysis rotation (a DCT implemented using matrix D) as follows:

$$t2_{rot}(n) = r1(n) \cdot D(n, m), \quad (11)$$

$$\text{where } n = [0 \ldots 15], m = [0 \ldots 15]$$

Stage 2 Shape Search

The goal of a generic PVQ(N, K) shape search procedure is to find the best normalized vector $x_q(n)$. In vector notation, $x_q(n)$ is defined as:

$$x_q = \frac{y}{\sqrt{y^T y}}, \quad (12)$$

where $y=y_{N,K}$ belongs to PVQ(N, K) and is a deterministic point on the surface of an N-dimensional hyperpyramid, the L1 norm of $y_{N,K}$ is K. In other words, $y_{N,K}$ is the selected integer shape code vector of size N according to:

$$y_{N,K} = \left\{ e\colon \sum_{n=0}^{N-1} |e_n| = K \right\} \tag{13}$$

That is $x_q$ is the unit energy normalized integer vector y, a deterministic point on the unit energy hypersphere. The best integer y vector is the one minimizing the mean squared shape error between the second stage target vector $t2_{rot}$(n) =x(n) and the normalized quantized output vector $x_q$. The shape search is achieved by minimizing the following distortion:

$$d_{PVQ\text{-}shape} = -x^T x = -\frac{(x^T y)}{\sqrt{y^T y}} \tag{14}$$

Equivalently, by squaring numerator and denominator, by maximizing the quotient $Q_{PVQ\text{-}shape}$:

$$Q_{PVQ\text{-}shape} = \frac{(x^T y)^2}{y^T y} = \frac{(\mathrm{corr}_{xy})^2}{\mathrm{energy}_y}, \tag{15}$$

where $\mathrm{corr}_{xy}$ is the correlation between vector x and vector y. In the search of the optimal PVQ vector shape y(n) with L1-norm K, iterative updates of the $Q_{PVQ.\text{-}shape}$ variables for each unit pulse position candidate $n_c$, may be made in the all positive "quadrant" in N-dimensional space according to:

$$\mathrm{corr}_{xy}(k, n_c) = \mathrm{corr}_{xy}(k-1) + 1 \cdot |x(n_c)| \tag{16}$$

$$\mathrm{energy}_y(k, n_c) = \mathrm{energy}_y(k-1) + 2 \cdot 1^2 \cdot y(k-1, n_c) + 1^2, \tag{17}$$

where $\mathrm{corr}_{xy}$(k−1) signifies the correlation achieved so far by placing the previous k−1 unit pulses, and $\mathrm{energy}_y$ (k−1) signifies the accumulated energy achieved so far by placing the previous k−1 unit pulses, and y (k−1, $n_c$) signifies the amplitude of y at position $n_c$ from the previous placement of a total of k−1 unit pulses:

$$Q_{PVQ\text{-}shape}(k, n_c) = \frac{(corr_{xy}(k, n_c))^2}{\mathrm{energy}_y(k, n_c)} \tag{18}$$

The best position $n_{best}$ for the k'th unit pulse, is iteratively updated by increasing $n_c$ from 0 to N−1:

$$n_{best} = n_c, \text{ if } Q_{PVQ\text{-}shape}(k, n_c) < Q_{PVQ\text{-}shape}(k, n_{best}) \tag{19}$$

To avoid division operations (which might be especially important in fixed point arithmetic) the $Q_{PVQ\text{-}shape}$ maximization update decision may be performed using a cross-multiplication of a saved best squared correlation numerator bestCorrSq so far and the saved best energy denominator bestEn so far:

$$\left.\begin{array}{c} n_{best} = n_c \\ bestCorrSqu = corr_{xy}(k, n_c)^2 \\ bestEn = \mathrm{energy}_y(k, n_c) \end{array}\right\}, \tag{20}$$

$$\text{if } corr_{xy}(k, n_c)^2 \cdot bestEn > bestCorrSq \cdot \mathrm{energy}_y(k, n_c)$$

The iterative maximization of $Q_{PVQ\text{-}shape}$(k, $n_c$) may start from a zero number of initially placed unit pulses ($y_{start}$(n) =0, for n=0 . . . 15) or alternatively from a low cost pre-placement number of unit pulses based on an projection to a integer valued point below the K'th-pyramid's surface, with a guaranteed undershoot of unit pulses in the target L1 norm K. Such a projection may be made as follows:

$$proj_{fac} = \frac{K-1}{\sum_{n=0}^{n=15} |t2_{rot}(n)|} \tag{21}$$

$$y_{start}(n) = \lfloor |t2_{rot}(n)| \cdot proj_{fac} \rfloor, \text{ for } n = 0 \ldots 15 \tag{22}$$

A projection to K (on the PVQ(N,K) pyramids surface) might also be used. It numerical precision issues result in a point above the pyramids surface, a new valid projection at or below the surface needs to be performed, or alternatively unit pulses are removed until the surface of the pyramid is reached.

For shape j=0, the set B positions only contain one single non-stacked unit pulse with a fixed energy contribution. This means that the search for the single pulse in set B may be simplified to search only for the maximum absolute value in the six set B locations.

Four signed integer pulse configurations vectors $y_j$ are established by using distortion measure $d_{PVQ\text{-}shape}$ and then their corresponding unit energy shape vectors $x_{q,j}$ are computed according to Equation (12). As each total pulse configuration $y_j$ always spans 16 coefficients, the energy normalization is always performed over dimension 16, even though two shorter sets are used for enumeration of the $y_0$ integer vector.

An efficient overall unit pulse search (for all four shape candidates) may be achieved by searching the shapes in the order from shape j=3 to shape j=0, by making a first projection to a point on or below the pyramid K=6, and then sequentially add unit pulses and save intermediate shape results until K is correct for each of the shape candidates with a higher number of unit pulses K. Note that as the regular set A shapes j=0, 1 spans over different allowed scale factor regions than the two outlier shapes (j=2, 3), the search start pulse configuration for the two regular shapes is handled by removing any unit pulses which are not possible to index in the regular shape sets A (for j=0,1). As the pulse search is performed in the all positive orthant, a final step of setting the signs of the non-zero entries in $y_j$(n) based on the corresponding sign of the target vector x(n) is performed.

An example of a search procedure corresponding to the above PVQ search strategy for the described PVQ based shapes is summarized in Table 2.

TABLE 2

Informational example of PVQ search strategy for the described PVQ based shapes.

| Search step | Related shape index (=j) | Description of search step | Resulting integer vector |
|---|---|---|---|
| 1 | 3 | Project to or below pyramid N = 16, K = 6 | $y_{3, start}$ |
| 2 | 3 | Add unit pulses until you reach L1norm = K = 6 over N = 16 samples | $y_{3,} = y_{2, start}$ |
| 3 | 2 | Add unit pulses until you reach L1norm = K = 8 over N = 16 samples | $y_{2,} = y_{1, pre\text{-}start}$ |
| 4 | 1 | Remove any unit pulses in $y_{1, pre\text{-}start}$ that are not part of set A to yield $y_{1, start}$ | $y_{1, start}$ |
| 5 | 1 | Update energy $en_y$ and correlation $corr_{xy}$ terms to reflect the pulses present in $y_{1, start}$ | $y_{1, start}$ (unchanged) |
| 6 | 1 | Add unit pulses until you reach L1norm = K = 10 over N = 10 samples (in set A) | $y_{1,} = y_{0, start}$ |
| 7 | 0 | Add unit pulses to $y_{0, start}$ until you reach L1norm = K = 1 over N = 6 samples (in set B) | $y_0$ |

TABLE 2-continued

Informational example of PVQ search strategy for the described PVQ based shapes.

| Search step | Related shape index (=j) | Description of search step | Resulting integer vector |
|---|---|---|---|
| 8 | 3, 2, 1, 0 | Add signs to non zero positions of each $y_j$ vector from the target vector x | $y_3, y_2, y_1, y_0$ |
| 9 | 3, 2, 1, 0 | Unit energy normalize each $y_j$ vector to candidate vector $x_{q, j}$ | $x_{q, 3}, x_{q, 2}, x_{q, 1}, x_{q, 0}$ |

An example of potentially available integer vectors $y_j$ and unit energy normalized vectors $x_{q,j}$, after the PVQ search are summarized in Table 3.

TABLE 3

Informational example of potentially available integer vectors $y_j$ and unit energy normalized vectors $x_{q, j}$, after the PVQ search.

| Shape index (=j) | Example Integer vector $y_j$ | Corresponding unit energy normalized vector $x_{q, j}$ (NB! shown in very low precision here) |
|---|---|---|
| 0 | $y_0$ = [−10, 0, 0, 0, 0, 0, 0, 0, 0, 0, 0, 0, 0, 0, 0, 1] | $x_{q, 0}$ = [−0.995, 0, 0, 0, 0, 0, 0, 0, 0, 0, 0, 0, 0, 0, 0, 0.100] |
| 1 | $y_1$ = [0, 0, 0, 0, 0, 0, 0, 0, 0, 10, 0, 0, 0, 0, 0, 0] | $x_{q, 1}$ = [0, 0, 0, 0, 0, 0, 0, 0, 0, 1.0, 0, 0, 0, 0, 0, 0] |
| 2 | $y_2$ = [0, 0, 0, 0, 0, 0, 0, 0, 0, 1, 0, 0, 0, 0, 0, −7] | $x_{q, 2}$ = [0, 0, 0, 0, 0, 0, 0, 0, 0, 0.141, 0, 0, 0, 0, 0, −0.990] |
| 3 | $y_3$ = [0, 0, 0, 0, 0, 0, 0, 0, 0, 0, −1, 1, −1, 1, −1, 1] | $x_{q, 3}$ = [0, 0, 0, 0, 0, 0, 0, 0, 0, 0, −0.408, 0.408, −0.408, 0.408, −0.408, 0.408] |

Adjustment Gain Candidates

There are four different adjustment gain candidate sets, one set corresponding to each overall shape candidate j. The adjustment gain configuration for each of the shapes are given in Table 4

TABLE 4

Scale factor VQ Second Stage Adjustment Gain sets including a global common gain factor of 2.5

| Gain set index (same as shape index = j) | Corresponding Shape name | Number of gain levels | Adjustment Gain set values ($G_{gain\_index, j}$) | Start adjustment gain index $Gminind_j$ | End adjustment gain index $Gmaxind_j$ |
|---|---|---|---|---|---|
| 0 | 'regular' | 2 | 2.5* {0.87, 1.18} = {2.175, 2.95} | 0 | 1 |
| 1 | 'regular_lf' | 4 | 2.5* {0.61, 1.47, 1.74, 2.05} | 0 | 3 |
| 2 | 'outlier_near' | 4 | 2.5* {0.69, 0.89, 1.10, 1.45} | 0 | 3 |
| 3 | 'outlier_far' | 8 | 2.5* {0.42, 0.49, 0.58, 0.80, 1.00, 1.25, 1.65, 1.94} | 0 | 7 |

Shape and Gain Combination Determination

The best possible shape and gain is determined among the possible shape candidates and each corresponding gain set. To minimize complexity the MSE versus the target may be evaluated in the rotated domain, i.e. the same domain as the shape search was performed in:

$$dMSE(j, i) = \sum_{n=0}^{15} (t2_{rot}(n) - G_{i,j} x_{q,j}(n))^2, \quad \text{for } j = 0 \ldots 3, i = 0 \ldots Gmaxind_j \tag{23}$$

Out of the total 18(2+4+4+8) possible gain-shape combinations, the shape_index(=j) and adjustment gain index gain_index(=i) that results in the minimum MSE are selected for subsequent enumeration and multiplexing:

$$\{\text{shape\_index} = j, \text{gain\_index} = i\} = \underset{j=0 \ldots 3, i=0 \ldots Gmaxindj}{\text{argmin}} \; dMSEj(j, i) \quad (24)$$

Enumeration of the Selected PVQ Pulse Configurations

The pulse configuration(s) of the selected shape are enumerated using an efficient scheme which separates each PVQ(N, K) pulse configuration into two short codewords; a leading sign index bit and an integer MPVQ-index codeword. The MPVQ-index bit-space is typically fractional (i.e. a non-power of 2 total number of pulse configurations). In FIG. 6 the enumeration of the selected integer vector $y_j$ into leading sign index bit LS_indA and MPVQ-index idxA (and additionally for shape j=0, into leading sign index bit LS_indB and MPVQ-index idxB) is implemented by the MPVQ-enumeration module 621.

The largest sized MPVQ integer shape index (j=2, 'outlier_near') fits within a 24 bit unsigned word, enabling fast implementations of MPVQ enumeration and de-enumeration on platforms supporting unsigned integer arithmetic of 24 bits or higher.

The enumeration scheme uses an indexing offsets table A(n, k) which may be found as tabled unsigned integer values below. The offset values in A (dimension n, L1-norm k) are defined recursively as:

$$A(n, k) = A(n-1, k-1) + A(n, k-1) + A(n-1, k), \quad (25)$$

with initial conditions A(n, k=0)=0 for n>=0, A(n=0, k)=1 for k>0.

The actual enumeration of a signed integer vector y(=vec_in) with an L1 norm of K(=k_val_in) over dimension N(=dim_in), into an MPVQ shape index index an and a leading sign index lead_sign_ind is shown in pseudo-code below:

```
[ index, lead_sign_ind ] =
MPVQ_enum( dim_in,                    /* i : dimension of vec_in      */
k_val_in,                      /* i : number of unit pulses      */
vec_in[N]                      /* i : PVQ integer pulse train    */
{
/* init                        */
next_sign_ind = 0x80000000U;                  /* sentinel for first sign */
k_val_acc     = 0;
pos           = dim_in;
index         = 0;
n             = 0;
row_ptr       = &(A[n]);
/* MPVQ-index composition loop */
tmp_h_row     = row_ptr[0];
for (pos--; pos >= 0; pos--) {
tmp_val                       = vec_in[pos];
[index, next_sign_ind]        = encPushSign(tmp_val, next_sign_ind, index);
index                         += tmp_h_row;
k_val_acc                     += abs(tmp_val);
if ( pos != 0 ) {
n += 1;                   /* switch row in offset table A(n, k) */
}
row_ptr        = &(A[n]);
tmp_h_row      = row_ptr[k_val_acc];
}
lead_sign_ind = next_sign_ind;
return [ index, lead_sign_ind ] ;
}
[ index, next_sign_ind ] =
encPushSign( val, next_sign_ind_in, index_in)
{
if ((next_sign_ind_in & 0x80000000U) == 0) && (val != 0) {
index = 2*index_in + next_sign_ind_in;
}
if ( val < 0 ) {
next_sign_ind = 1;
}
if ( val > 0 ){
next_sign_ind = 0;
}
return [ index, next_sign_ind ];
}
```

MPVQ enumeration calls for a selected shape (j) are summarized in Table 5:

TABLE 5

Scale factor VQ second stage shape enumeration of integer vector $y_j$ into leading signs indices and MPVQ shape indices for each possible selected shape index j.

| Shape index (j) | Shape name | Scale factor set A enumeration | Scale factor set B enumeration |
|---|---|---|---|
| 0 | 'regular' | [LS_indA, idxA] = MPVQenum(10, 10, $y_0$) | $z(10 - n) = y_0(n)$, for n = 10 . . . 15 [LS_indB, idxB] = MPVQenum(6, 1, z); |

TABLE 5-continued

Scale factor VQ second stage shape enumeration of integer vector $y_j$ into leading signs indices and MPVQ shape indices for each possible selected shape index j.

| Shape index (j) | Shape name | Scale factor set A enumeration | Scale factor set B enumeration |
|---|---|---|---|
| 1 | 'regular_lf' | [LS_indA, idxA] = MPVQenum(10, 10, $y_1$) | n/a |
| 2 | 'outlier_near' | [LS_indA, idxA] = MPVQenum(16, 8, $y_2$) | n/a |
| 3 | 'outlier_far' | [LS_indA, idxA] = MPVQdeum(16, 6, $y_3$) | n/a |

Multiplexing of Scale Factor VQ Codewords

First Stage Multiplexing:

The stage 1 indices are multiplexed in the following order: ind_LF (5 bits) followed by ind_HF (5 bits).

Second Stage Multiplexing:

To efficiently use the available total bit space for the scale factor quantizer (38 bits), in combination with the fractional sized MPVQ-indices, the shape index j, the second stage shape codewords and potentially an LSB of the gain codeword are jointly encoded. The overall parameter encoding order for the second stage multiplexing components is shown in Table 6.

TABLE 6

Multiplexing order and parameters for the second stage.

| scale factor - VQ Stage 2 Parameter Multiplexing order | Stage 2 parameter description | Parameter |
|---|---|---|
| 0 | stage 2 submode bit | j >> 1, (as an MSB submode bit) |
| 1 | Adjustment gain or MSBs of the adjustment gain | i, (the actual gain index), for even(j) (or i >> 1; for odd (j) |
| 2 | leading sign of shape in set A | $LeadSign_A$ |
| 3 | a joint shape index(for set A and set B) and possibly a submode LSB-bit and a gain LSB bit. | Joint composition of: ($index_{shapeA}$, $LeadSign_B$, $index_{shapeB}$, $LSB_{submode}$, $LSB_{gain}$) The LSB submode bit is encoded as a specific bitspace section inside the overall joint shape codeword $index_{joint}$. |

In the multiplexing of leading signs $LeadSign_A$ and/or $LeadSign_B$, each leading sign is multiplexed as 1 if the leading sign is negative and multiplexed as a 0 if the leading sign is positive. Table 7 shows submode bit values, sizes of the various second stage MPVQ shape indices, and the adjustment gain separation sections for each shape index (j).

TABLE 7

Submode bit values, sizes of the various second stage MPVQ shape indices, and the adjustment gain separation sections for each shape index (j).

| Shape index (j) | Shape name | MSB Submode bit value (regular/outlier) | $SZ_{MPVQ}$ Set A (excl. $LeadSign_A$) | $SZ_{MPVQ}$ Set B (excl. $LeadSign_B$) | Number of LSB gain index code points | Adjustment gain index bit separation {MSBs, LSB} |
|---|---|---|---|---|---|---|
| 0 | 'regular' | 0 | $SZ_{shapeA,0}$ = 2390004 (~21.1886 bits) | $SZ_{shapeB,0}$ = 6 (~2.585 bits) | 0 | {1, 0} |
| 1 | 'regular_lf' | 0 | $SZ_{shapeA,1}$ = $SZ_{shapeA,0}$ | $SZ_{shapeB,1}$ = 1 (0 bits) | 2 | {1, 1} |
| 2 | 'outlier_near' | 1 | $SZ_{shapeA,2}$ = 15158272 (~23.8536 bits) | n/a | 0 | {2, 0} |
| 3 | 'outlier_far' | 1 | $SZ_{shapeA,3}$ = 774912 (~19.5637 bits) | n/a | 2 | {2, 1} |

Encoding of Gain or MSB of Gains:

For a selected shape with shape index j=0 and j=2, the selected gain index is sent without modification as index i, for gain value $G_{i,j}$, requiring 1 bit for j=0 and 2 bits for j=2.

For a selected shape with shape index j=1 and j=3, and a selected gain value $G_{i,j}$ with gain index i, the MSB part of the gain index is first sent by a removal of the $LSB_{gain}$ bit. That is. $i_{MSBs}$=i>>1; $LSB_{gain}$=i&0×1; The multiplexing of $i_{MSBs}$ will require 1 bit for j=1 and 2 bits for j=3. The $LSB_{gain}$ bit will be multiplexed into the joint index.

In FIG. 6 the joint index composition based on the selected shape j and the selected gain index i and the enumerated leading sign index bit LS_indA and MPVQ-index idxA (and for shape j=0, leading sign index bit LS_indB and MPVQ-index idxB) is performed by the joint index composition module 622, and further the result of the joint composition is sent to the encoder multiplexor module 623 for subsequent transmission to the decoder.

Joint Index Composition:

Composition of the joint index for a selected shape index of j=0 ('regular') is determined as:

$$\text{index}_{joint,0}=(2\cdot\text{index}_{shapeB}+LeadSign_B+2)\cdot SZ_{shapeA,0}+\text{index}_{shapeA,0} \quad (26)$$

Composition of the joint index for a selected shape index of j=1 ('regular_lf') is determined as:

$$\text{index}_{joint,1}=LSB_{gain}\cdot SZ_{shapeA,1}+\text{index}_{shapeA,1} \quad (27)$$

Composition of the joint index for a selected shape index of j=2 ('outlier_near') is determined as:

$$\text{index}_{joint,2}=\text{index}_{shapeA,2} \quad (28)$$

Composition of the joint index for a selected shape index of j=3 ('outlier_far')

$$\text{index}_{joint,3}=SZ_{shapeA,2}+(SZ_{shapeA,3}\cdot LSB_{gain})+\text{index}_{shapeA,3} \quad (29)$$

Synthesis of the Quantized Scale Factor Vector

The quantized first stage vector st1, the quantized second stage unit energy shape vector $x_{q,j}$ and the quantized adjustment gain $G_{i,j}$ (with gain index i) are used to establish the quantized scale factor vector scfQ(n) as follows:

$$st2(n)=G_{i,j}\cdot\left[x_{q,j}(n)\cdot D^T\right] \text{ for } n=0\ \dots\ 15 \quad (30)$$

$$scfQ(n)=st1(n)+st2(n) \text{ for } n=0\ \dots\ 15 \quad (31)$$

In equation (30, the $x_{q,j}(n)\cdot D^T$ vector times matrix multiplication realizes the IDCT synthesis transform. Even though this (Equations 30 and 31) quantized scale factor generation takes place on the encoder side, the corresponding steps are performed the same way in the decoder, see FIG. 7 modules 702; SCF VQ-stage 1 contribution, 706; Inverse warping/transform, the adjustment gain in module 707, and the addition in module 708.

Scale Factor Application and Quantization of the Normalized Spectrum

The quantized scale factor vector scfQ(n) is now used to scale/normalize the MDCT coefficients c(n) into cnorm(n) as follows:

$$cnorm(n)=c(n)/2^{scfQ\left(floor\left(\frac{n}{L_{band}}\right)\right)} \text{ for } n=[0\ \dots\ (N_{coded}-1)\} \quad (32)$$

The normalized coefficients cnorm(n) may be quantized using a logarithmic PCM quantizer, like ITU-T G.711, where G.711 is defined for using 8 bits per coefficient, into normQ(n) for n=(0. . . Ncoded−1). And G711 mu-law may handle a dynamic range of 14 bits.

The resulting residual spectrum parameter bytes spec(n) for n=(0 . . . Ncoded−1) are forwarded on the transport channel, where each spec(n) is a G.711 8 bit index.

Decoder Side Scale Factor Inverse Quantization

In some aspects the decoder performs the following steps. A set of 16 quantized scale factors is first decoded as described for/in the encoder. These quantized scale factors are the same as the quantized scale factors obtained in the encoder. The quantized scale factors are then used to shape the received MDCT normalized spectrum coefficient as described below.

Figure 7:
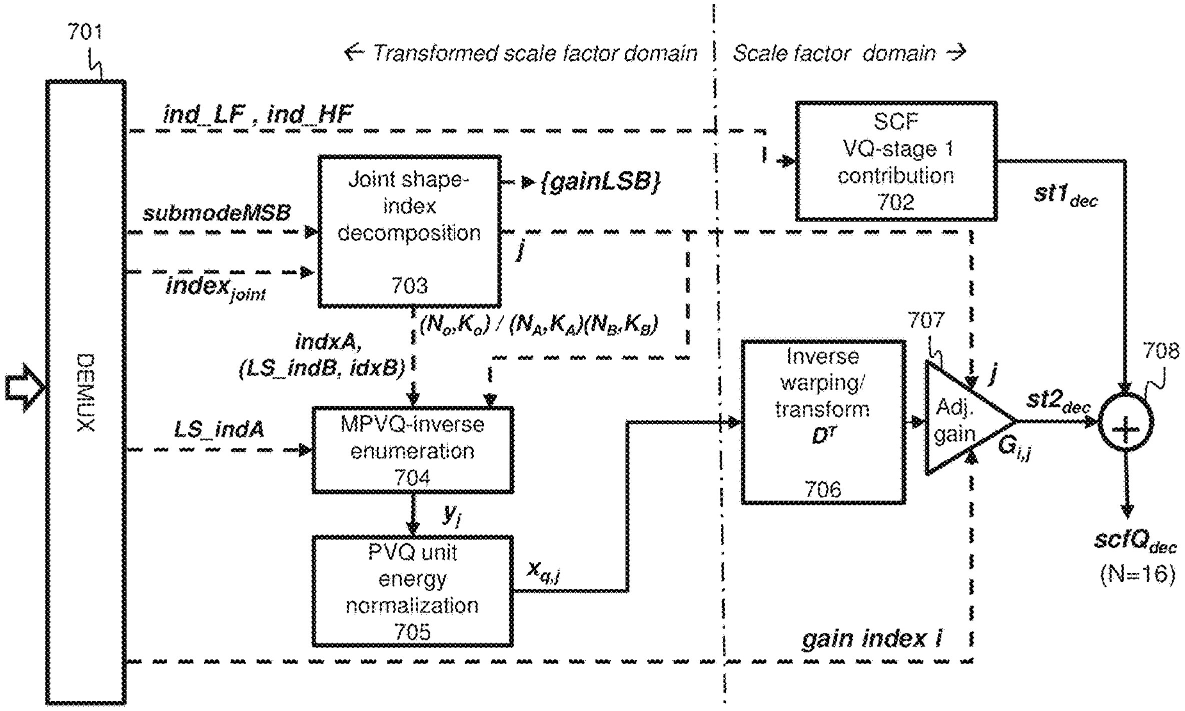
FIG. 7 illustrates an example of a decoder.
Figure 15:
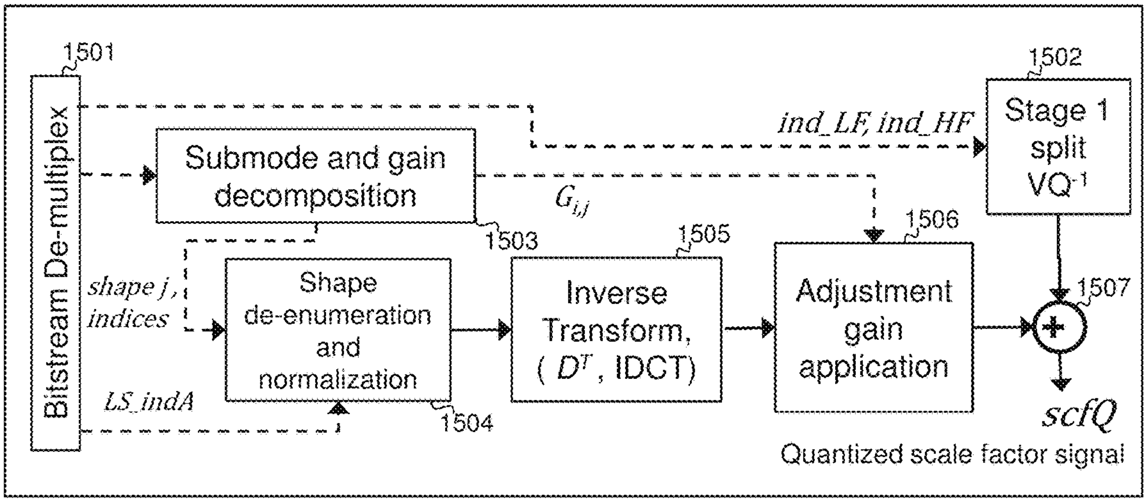
FIG. 15 illustrates an example of a decoder.

FIG. 15 schematically illustrates functional modules of a corresponding decoder for the encoder employing the above disclosed stage 1 and stage 2 VQ. A complementary representation of this decoder is shown in FIG. 7.

Stage 1 Scale Factor VQ Decoding

The first stage parameters are decoded, in FIG. 7 this is performed by the demultiplexor module 701; and in FIG. 14 this is performed by the bitstream demultiplexor module 1501 as follows:

```
ind_LF = read_indice(5); /* stage1 LF 5 bits */
ind_HF = read_indice(5); /* stage1 HF 5 bits */
```

The first stage indices ind_LF and ind_HF are converted to signal st1(n) according to Equations (7) and (8) above, in FIG. 7 this is performed in the stage 1 contribution module 702; and in FIG. 14 this is performed by the stage 1 inverse split VQ module 1502.

Stage 2 Scale Factor VQ Decoding

To efficiently use the available total bit space for the scale factor quantizer (38 bits), in combination with the fractional sized MPVQ-indices, the shape selection, the second stage shape codewords and the adjustment gain least significant bit are jointly encoded as described in Table 7. On the decoder/receiver side the reverse process takes place. The second stage submode bit, initial gain index and the Leading Sign index are first read from the bitstream decoded as follows:

```
submodeMSB = read_bit( );
if ( submodeMSB==0 ){
Gind            = read_indice(1);     /* regular/regular_lf */
} else {
Gind            = read_indice(2);     /* outlier_* */
}
LS_indA         = read_bit( );        /* shapeA LeadingSign 1 bit */
```

If subModeMSB equals 0, corresponding to one of the shapes (j=0 or j=1), the following demultiplexing procedure is followed:

```
/* regular/regular_lf demultiplexing, establish if shape_j is 0 or 1 */
tmp32 = read_indice(13) ;
tmp32 |= (read_indice(12)<<13) ;
[ BER_detect , submodeLSB, idxA, idxBorGainLSB ] =
   dec_split_st2VQ_CW(tmp32, 4780008U>>1, 14 );
if( submodeLSB != 0 ) {
Gind            = (Gind<<1) + idxBorGainLSB;  /* for regular_lf */
} else {
idxB            = idxBorGainLSB>>1;           /* for regular */
    LS_indB = idxBorGainLSB&0x1);
}
with function dec_split_st2VQ_CW defined as:
[BER_detect, submodeLSB, idxA, idxBorGainLSB ] =
dec_split_st2VQ_CW( cwRx, szA, szB )
{
if( cwRx >= szB * szA) {
idxA            = 0;
idxBorGainLSB   = 0;
submodeLSB      = 0;
BER_detect      = 1;
return;
}
idxBorGainLSB       = floor( cwRx / szA );
    /* this high numeric precision cwRx /szA division may preferably be
implemented as a binary search over the 14 possible szB outcomes */
/* or as a initial approximative multiplication by 1/szA followed by testing
resulting idxB as +1, 0, -1 of the multiplication result */
idxA            = cwRx - idxBorGainLSB*szA;
submodeLSB      = 0;
idxBorGainLSB   = idxBorGainLSB - 2 ;
if( idxBorGainLSB < 0 ) {
submodeLSB = 1;
}
idxBorGainLSB   = idxBorGainLSB + 2*submodeLSB ;
BER_detect      = 0;
return;
}
```

If subModeMSB equals 1, ('outlier_near' or 'outlier_far' submodes) the following demultiplexing procedure is followed:

```
    /* outlier_* demultiplexing, establish if shape_j is 2 or 3 */
    tmp32 =           read_indice(12);
    tmp32 |= ( read_indice(12)<<12 );
    idxA              = tmp32;
```

-continued

```
idxB            =       -1;
submodeLSB      = 0;
BER_detect      = 0;
if ( tmp32 >=           ((30316544U>>1) + 1549824U) ) {
BER_detect      = 1;
} else {
tmp32                   -= (30316544U>>1);
if( tmp32 >= 0 ) {
submodeLSB          = 1;
Gind                = (Gind<<1) + (tmp32&0x1);
idxA                = tmp32>>1;
}
}
```

Finally the decombined/demultiplexed second stage indices j and i are determined as follows:

```
shape_j = (submodeMSB<<1) + submodeLSB;
j   = shape_j;
i   = G_ind;
```

In FIG. 7 the 24- or 25-bit joint index is read from the demux module 701, where the joint index is denoted tmp32 in the pseudo code above, decomposition is performed by the joint shape index decomposition module 703, and the resulting decoded shape index j and the resulting shape indices (idxA, LS_indB, indxB)) are forwarded to the de-enumeration module 704. When the LS_indA index bit is a single bit it may be obtained directly from the demux module 701. For j=1 and j=3, the joint shape index decomposition module 703 also outputs the least significant gain bit gainLSB and combines that into a final gain index i. After the MPVQ-inverse enumeration has been performed by the de-enumeration module 704, the vector $y_j$ is normalized into a unit energy vector $x_{q,j}$ by the PVQ unit energy normalization module 705. Subsequently, the forward synthesis transform (DCT) is applied by the inverse warping/transform module 706, and the resulting vector is then by the adjustment gain module 707 scaled by gain $G_{i,j}$. The quantized scale factor signal is obtained by adding the scaled vector, by the adder module 708, to the SCF VQ-stage 1 contribution module 702.

De-Enumeration of the Shape Indices

If shape_j is 0, two shapes A(LS_indA, idxA), B(LS_indB, idxB), are de-enumerated into signed integer vectors, otherwise (shape_j is not 0) only one shape is de-enumerated. The setup of the four possible shape configurations are described in Table 1.

The actual de-enumeration of a leading sign index LS_ind and an MPVQ shape index MPVQ_ind into an signed integer vector y (denoted vec_out) with an L1 norm of K (denoted k_val_in) over dimension N (denoted dim_in), is shown in pseudo code below.

```
MPVQdeenum (   dim_in,           /* i : dimensions of vec_out       */
k_val_in,             /* i :   number of unit pulses     */
LS_ind,               /* i :   leading sign index        */
MPVQ_ind,             /* i :   MPVQ shape index          */
*vec_out              /* o :   PVQ integer pulse train   */
{
for (i=0; i < dim_in; i++) {
vec_out [i] = 0;
}
leading_sign = 1;
if   (   LS_ind != 0 ) {
leading_sign = -1;
}
```

-continued

```
   mind2vec_tab_fx(   dim_in,
                                            k_val_in,
                                            leading_sign,
MPVQ_ind,
vec_out,
A   ) ;
return;
}
with:
mind2vec_tab_fx(short                              dim_in,            /* i: dimension
short                 k_max_local,       /* i:      nb unit pulses       */
short                 leading_sign,      /* i:      leading_sign        */
unsigned int ind,                                /* i:      MPVQ-index              */
short                 vec_out,                   /* o:      pulse train             */
unsigned in       A   [ ] [11]                   /* i:      offset matrix           */
)
{
/* init */
h_row_ptr = & (A [ (dim_in-1) ] [0] ) ;
k_acc        = k_max_local;
/* loop over positions */
for   (pos = 0; pos < dim_in; pos++)   {
if   (   ind != 0 )   {
k_acc                  = k_max_local;;
UL_tmp_offset   = h_row_ptr[k_acc] ;
wrap_flag       =   (ind < UL_tmp_offset   )   ;
UL_diff            = ind - UL_tmp_offset;
while   (   wrap_flag != 0)   {
k_acc--;
wrap_flag = (ind < h_row_ptr[k_acc]);
UL_diff   = ind -  h_row_ptr[k_acc];
}
ind          = UL_diff;
k_delta   = k_max_local - k_acc;
} else {
mind2vec_one_fx (k_max_local,   leading_sign, ind, &vec_out[pos]);
break;
}
k_max_local = setval_update_sign_fx(
                                    k_delta,
                                    k_max_local,
                                    &leading_sign,
                                    &ind,
                                    &vec_out[pos]);
h_row_ptr -= 11;                          /* reduce dimension by one step */
}
return;
}
with:
mind2vec_one_fx(   short                      k_val_in,              /* i: nb unit pulses */
short   leading_sign,                     /* i: leading sign   -1, 1 */
short *vec_out                            /* o:   updated pulse train      /*
)
{
amp = k_val_in;
if   (   leading_sign < 0 )
{
amp = -k_val_in   ;
}
*vec_out = amp;
return;
}
with:
[ k_max_local_out ]   =   setval_update_sign   (
        short k_delta                           /* i   */
        short k_max_local_in,                   /* i   */
        short *leading_sign,                    /* i/o   */
        short *ind_in,                          /* i/o   */
short *vec_out                          /* i/o   */
)
{
k_max_local_out = k_max_local_in;
if      (k_delta != 0)   {
mind2vec_one_fx(k_delta,   *leading_sign, *ind_in, vec_out);
*leading_sign                  =   get_lead_sign_fx ( ind_in );
k_max_local_out                -= k_delta ;
}
return k_max_local_out;
}
```

-continued

```
with:
[   leading_sign   ] =   get_lead_sign_fx(unsigned in       *ind_in    )
{
leading_sign                = +1;
if  (   ((*ind) &0x1    )   != 0 ) {
leading_sign =   −1;
}
(*ind) = (*ind >> 1);
return leading_sign;
}
```

MPVQ de-enumeration calls according to Table 8 are made for the demultiplexed shape (j).

TABLE 8

Scale factor VQ second stage shape de-enumeration into integer vector $y_j$ for each possible received shape index j.

| Shape index (j) | Shape name | Scale factor set A de-enumeration | Scale factor set B de-enumeration (or initialization) |
|---|---|---|---|
| 0 | 'regular' | MPVQdeenum(10, 10, $y_0$, LS_indA, idxA) | MPVQdeenum(6, 1, z, LS_indB, idxB); $y_o(n) = z(n-10)$, for n = 10 . . . 15 |
| 1 | 'regular_lf' | MPVQdeenum(10, 10, $y_1$, LS_indA, idxA) | $y_1(n) = 0$, for n = 10 . . . 15 |
| 2 | 'outlier_near' | MPVQdeenum(16, 8, $y_2$, LS_indA, idxA) | n/a |
| 3 | 'outlier_far' | MPVQdeenum(16, 6, $y_3$, LS_indA, idxA) | n/a |

Unit Energy Normalization of the Received Shape

The de-enumerated signed integer vector y is normalized to an unit energy vector $x_{q,j}$ over dimension 16 according to Equation (12).

Reconstruction of the Quantized Scale Factors

The adjustment gain value $G_{i,j}$ for gain index i and shape index j is determined based on table lookup (see encoder Table 4).

Finally, the synthesis of the quantized scale factor vector scfQ(n) is performed the same way as on the encoder side (see, Equations 30 and 31).

The final quantized scale factor generation is in FIG. 7 performed by modules 702 (stage 1 contribution), 706 (forward synthesis transform) and 707 (gain application) together with the vector addition in module 708. The quantized scale factor generation is also illustrated in FIG. 15 modules 1502 (stage 1 inverse VQ), 1505 (inverse synthesis transform), 1506 (adjustment gain application), and 1507 (vector addition).

Decoder Side Inverse Quantization of the Normalized Spectrum and Scale Factor Application The spectrum parameter bytes spec(n) for n=(0 . . . Ncoded−1), received over a communications channel are dequantized using an inverse logarithmic pcm quantizer, like ITU-T G.711 (using 8 bits per coefficient) into cnormQ(n) for n=(0 . . . Ncoded−1). The quantized scale factor vector scfQ(n) is now used to scale the quantized normalized MDCT coefficients cnormQ(n) into cQ(n) as follows:

$$cQ(n) = cnormQ(n) * 2^{scfQ\left(floor\left(\frac{n}{L_{band}}\right)\right)} \text{for } n = [0 \ \ldots \ (N_{coded} - 1)\} \tag{33}$$

Finally the inverse MDCT (see e.g. ITU-T G.719 decoder) is applied to the scaled quantized spectrum as follows:

$$sQ(t) = IMDCT(cQ(n)) \tag{34}$$

Further after the IMDCT the signal sQ(t) is windowed and the required MDCT overlap add (OLA) operation is performed to obtain the final synthesized time domain signal, see e.g. ITU-T G.719 decoder where a sine window is applied before the MDCT OLA.

Figure 9:
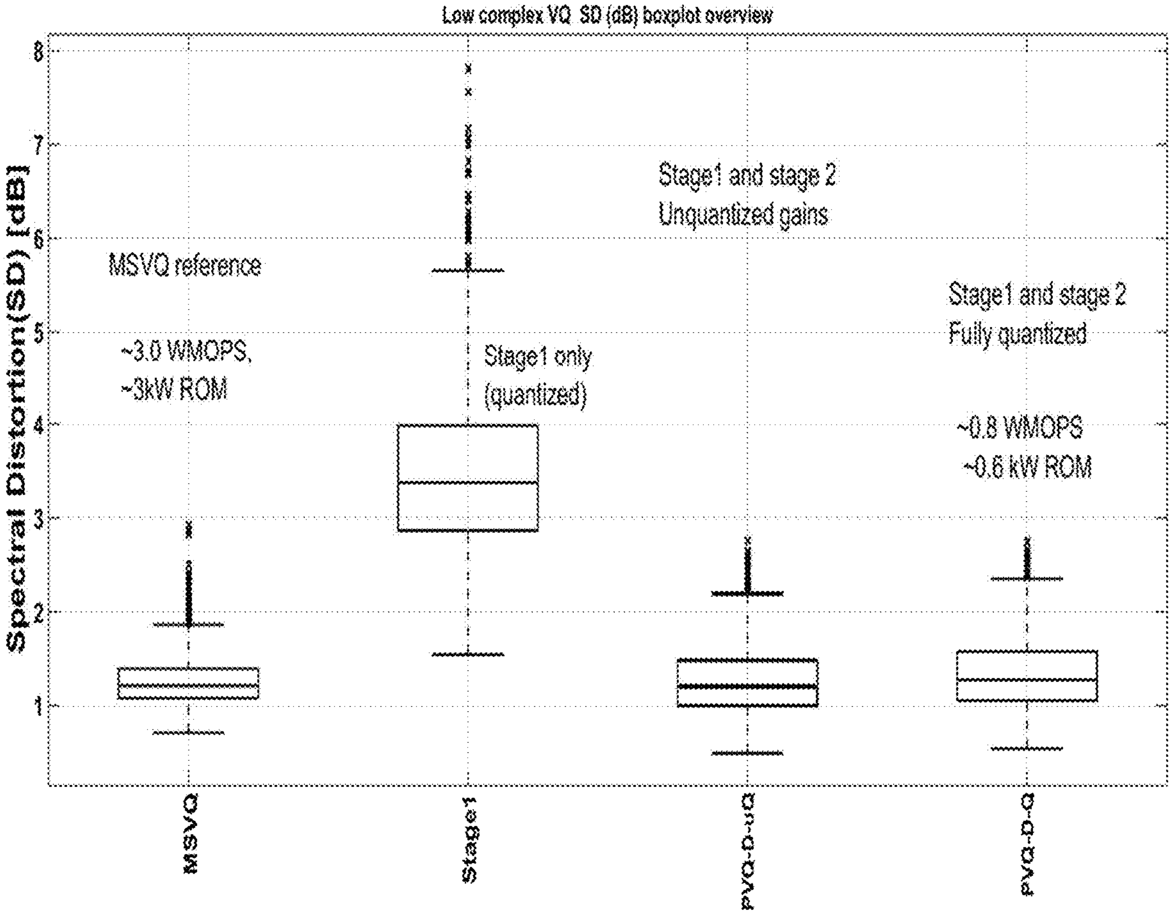
FIG. 9 shows example results in terms of spectral distortion for 38 bit quantization of the envelope representation coefficients.

FIG. 9 shows example results in terms of Spectral Distortion (SD) for 38 bit quantization of the envelope representation coefficients. In the figure a reference 38 bit Multistage-Split VQ ('MSVQ') based VQ performs slightly better (having lower Median SD at about 1.2 dB), than the proposed example quantizer, which has slightly higher median SD at about 1.25. In these statistical SD boxplots the median is given as the center line in each box, and the complete box shows the 25 and 75 percentiles, and crosses show outlier points. The example fully quantized 'PVQ-D-Q' 38 bit quantizer provides much lower complexity in terms of both Weighted Million Operations per Second (WMOPS) and required table Read Only Memory (ROM). As can be seen in FIG. 9, the second stage reduces the SD from the first stage (3.5 dB) to about 1.25 dB when both the first and the second stage are employed.

Below follows listings of first stage scale factors (LFCB and HFCB), MPVQ indexing offset table A, and a DCT rotation matrix D.

```
LFCB[32][8] =
{ 2.2628 0.8133 −0.5302 −1.3566 −1.5995 −1.4410 −1.1438 −0.7552
2.9452 2.4114 0.9605 −0.4432 −1.2291 −1.5559 −1.4969 −1.1169
−2.1861 −1.9715 −1.7872 −1.9187 −1.7940 −1.3574 −0.7054 −0.0478
0.6937 0.9556 0.5752 −0.1146 −0.6461 −0.9524 −1.0741 −0.7581
−1.2975 −0.7404 −0.3454 −0.3133 −0.4030 −0.3720 −0.0783 0.0970
0.9147 1.7429 1.9091 1.5441 1.0934 0.6475 0.0362 −0.2971
−2.5143 −2.8918 −2.0045 −0.7509 0.4412 1.2019 1.3274 1.2205
−0.9222 0.6325 1.0874 0.6086 0.1312 −0.2961 −0.2070 0.1349
0.7903 0.6284 0.3931 0.4800 0.4478 0.2097 0.0066 −0.0861
1.4478 2.7240 2.3108 0.9351 −0.2747 −0.9021 −0.9407 −0.6337
0.7934 0.0144 −0.5678 −0.6548 −0.4795 −0.1739 0.0680 0.2951
2.7243 2.9595 1.8495 0.5633 0.1399 0.3596 0.6895 0.6398
−0.5308 −0.2127 0.0058 0.4249 0.4731 0.8589 1.1911 0.9962
1.6873 2.4361 2.3302 1.7798 1.4441 1.5200 1.4720 0.9777
−2.9518 −1.5939 −0.1099 0.3886 0.5129 0.6281 0.8226 0.8759
0.1019 0.5899 0.6190 1.2673 2.4196 2.2517 0.5265 −0.3966
2.6825 1.3274 0.1302 −0.3385 −0.3682 −0.1917 −0.1548 −0.2342
4.8270 3.1195 1.3951 0.2503 −0.3936 −0.6435 −0.6426 −0.7232
```

-continued

```
0.0878 −0.5696 −1.1451 −1.6697 −1.8453 −1.5647 −1.1175 −0.5340
1.3910 1.9815 1.1127 −0.2201 −0.7750 −0.5941 0.1369 0.8182
0.3846 −0.1606 −0.5394 −0.5293 0.1904 2.5606 2.8190 0.6567
1.9323 3.0103 3.0654 2.5011 1.9309 0.5722 −0.8117 −1.1764
0.1751 −0.7505 −1.0394 −1.1358 −1.0420 −0.0152 2.0705 3.4295
−1.1882 0.3668 1.3096 1.6833 1.2510 0.9424 0.8263 0.4400
2.5332 2.1127 1.2629 0.7615 0.5221 0.1187 −0.4523 −0.7004
3.9989 4.0790 2.8229 1.7261 0.6471 −0.3311 −0.8840 −1.1270
0.5079 1.5884 1.7290 1.0069 0.3771 0.4764 1.0875 1.0876
3.1686 3.2585 2.4223 1.7945 1.5218 1.1720 0.4894 −0.0623
1.8941 1.2511 0.5905 0.6084 0.8782 1.1191 1.0186 0.6205
0.9489 2.1324 2.7235 2.7699 2.5429 2.0205 0.8300 −0.0276
−1.8803 −1.2643 0.3114 1.8367 2.2563 2.0482 2.1953 2.0266
0.2464 0.9556 1.5205 1.9765 1.9404 2.2338 1.9884 1.2723
};
HFCB[32][8} =
{ 0.2320 −1.0089 −2.1422 −2.3753 −2.2304 −2.1760 −2.2907 −2.5329
−1.2950 −1.7993 −1.8870 −1.8099 −1.7634 −1.8342 −1.8048 −1.7368
0.1393 −0.2582 −0.6508 −1.0682 −1.6193 −2.1876 −2.6376 −2.9790
−0.3165 −0.4777 −0.5512 −0.4848 −0.2384 −0.1430 0.0683 0.0883
0.8795 0.2983 −0.9154 −2.2065 −2.7414 −2.8614 −2.8884 −2.9518
−0.2967 −0.9750 −1.3586 −0.9837 −0.6530 −0.9900 −1.6147 −2.4071
0.3410 0.2689 0.0563 0.0499 −0.0954 −0.7602 −2.3276 −3.7716
−1.4123 −1.4852 −1.1860 −0.6250 0.1539 0.5764 0.7951 0.5966
−0.2288 −0.3337 −0.8093 −1.6359 −1.8849 −1.6450 −1.4052 −1.4667
```

-continued

```
−1.0715 −1.4177 −1.5489 −1.4530 −1.0318 −0.6906 −0.4288 −0.4950
−0.5910 −0.0712 0.3457 0.3005 −1.1187 −2.4409 −2.2285 −1.8951
−0.8484 −0.5832 0.0900 0.8450 1.0657 0.7376 0.2566 −0.4920
1.1407 0.9640 0.3815 −0.4828 −1.8163 −2.8028 −3.2339 −3.4591
−0.3763 0.0426 0.5165 0.2517 −0.2162 −0.5341 −0.6408 −0.8697
0.6650 1.0979 1.3834 1.3433 0.8230 0.2159 −0.4049 −1.0703
−0.8263 −0.6712 −0.2285 0.5190 1.3672 2.1802 2.5360 2.2012
1.4101 0.7544 −1.3055 −1.8713 −1.2401 −1.2671 −2.0367 −2.8969
0.3614 −0.0220 −0.5794 −0.8794 −0.8507 −0.7794 −0.7322 −0.8883
0.4375 0.3054 −0.0074 −0.4956 −0.8067 −1.2243 −1.7016 −2.2449
0.6481 0.6823 0.2532 0.0736 0.3142 0.2347 0.1446 −0.0682
1.1192 1.2347 0.5892 −1.3719 −2.3710 −2.0078 −1.6669 −1.9263
0.1418 −0.1107 −0.2828 −0.0066 0.2859 0.0460 −0.6026 −2.2657
0.5040 0.8270 1.1198 1.1791 1.0799 0.6975 −0.9125 −3.5768
−0.5011 −0.3257 0.0281 0.2621 0.3606 0.6356 0.9590 1.3075
3.7497 1.5234 −0.4577 −0.7987 −0.3868 −0.3759 −0.6578 −1.2816
−1.1526 −1.1080 −0.5626 −0.2206 −0.3498 −0.7534 −0.9886 −1.2879
1.0283 1.0977 0.7686 0.2061 −0.3428 −0.7549 −1.0420 −1.5034
0.1288 0.6894 1.1235 1.3093 1.3551 1.4231 1.1571 0.4063
1.3403 1.3900 1.0447 0.6358 −0.2747 −1.5492 −2.4424 −3.0246
2.1384 4.2471 2.8973 0.9327 −0.2928 −0.8104 −0.7889 −0.9354
0.5648 1.5918 2.3977 3.0370 2.6642 1.3930 0.4038 −0.6563
−0.4225 0.3261 1.3917 2.2315 2.6118 2.6654 2.4010 1.7592
};
```

```
unsigned int A[1+16][1+10]=
/* k=0,k=1,k=2,... , k=10*/
/* n= 0 */ 0U,1U,1U, 1U, 1U, 1U, 1U, 1U, 1U, 1U, 1U,
/* n= 1 */ 0U,1U,3U, 5U, 7U, 9U, 11U, 13U, 15U, 17U, 19U,
/* n= 2 */ 0U,1U,5U, 13U, 25U, 41U, 61U, 85U, 113U, 145U, 181U,
/* n= 3 */ 0U,1U,7U, 25U, 63U, 129U, 231U, 377U, 575U, 833U, 1159U,
/* n= 4 */ 0U,1U,9U, 41U, 129U, 321U, 681U, 1289U, 2241U, 3649U, 5641U,
/* n= 5 */ 0U,1U,11U, 61U, 231U, 681U, 1683U, 3653U, 7183U, 13073U, 22363U,
/* n= 6 */ 0U,1U,13U, 85U, 377U, 1289U, 3653U, 8989U, 19825U, 40081U, 75517U,
/* n= 7 */ 0U,1U,15U, 113U, 575U, 2241U, 7183U, 19825U, 48639U, 108545U, 224143U,
/* n= 8 */ 0U,1U,17U, 145U, 833U, 3649U, 13073U, 40081U, 108545U, 265729U, 598417U,
/* n= 9 */ 0U,1U,19U, 181U, 1159U, 5641U, 22363U, 75517U, 224143U, 598417U, 1462563U,
/* n=10 */ 0U,1U,21U, 221U, 1561U, 8361U, 36365U, 134245U, 433905U, 1256465U, 3317445U,
/* n=11 */ 0U,1U,23U, 265U, 2047U, 11969U, 56695U, 227305U, 795455U, 2485825U, 7059735U,
/* n=12 */ 0U,1U,25U, 313U, 2625U, 16641U, 85305U, 369305U, 1392065U, 4673345U, 14218905U,
/* n=13 */ 0U,1U,27U, 365U, 3303U, 22569U, 124515U, 579125U, 2340495U, 8405905U, 27298155U,
/* n=14 */ 0U,1U,29U, 421U, 4089U, 29961U, 177045U, 880685U, 3800305U, 14546705U, 50250765U,
/* n=15 */ 0U,1U,31U, 481U, 4991U, 39041U, 246047U, 1303777U, 5984767U, 24331777U, 89129247U};
```

```
/* DCT Rotation matrix */
double D[16][16] = {
/* first row results in the first coeff in fwd synthesis transform (decoder) */
/* first column results in the first coeff in the analysis transform (encoder) */
+2.500000000000000e−01, +3.518509343815957e−01, +3.467599613305369e−01, +3.383295002935882e−01,
+3.266407412190941e−01, +3.118062532466678e−01, +2.939689006048397e−01, +2.733004667504394e−01,
+2.500000000000001e−01, +2.242918965856591e−01, +1.964237395967756e−01, +1.666639146194367e−01,
+1.352990250365493e−01, +1.026311318805893e−01, +6.897484482073578e−02, +3.465429229977293e−02
+2.500000000000000e−01, +3.383295002935882e−01, +2.939689006048397e−01, +2.242918965856591e−01,
+1.352990250365493e−01, +3.465429229977286e−02, −6.897484482073579e−02, −1.666639146194366e−01,
−2.500000000000001e−01, −3.118062532466678e−01, −3.467599613305369e−01, −3.518509343815956e−01,
−3.266407412190941e−01, −2.733004667504394e−01, −1.964237395967756e−01, −1.026311318805893e−01,
+2.500000000000000e−01, +3.118062532466678e−01, +1.964237395967756e−01, +3.465429229977286e−02,
−1.352990250365493e−01, −2.733004667504394e−01, −3.467599613305369e−01, −3.383295002935882e−01,
−2.500000000000001e−01, −1.026311318805894e−01, +6.897484482073574e−02, +2.242918965856590e−01,
+3.266407412190941e−01, +3.518509343815957e−01, +2.939689006048397e−01, +1.666639146194367e−01,
+2.500000000000000e−01, +2.733004667504394e−01, +6.897484482073575e−02, −1.666639146194366e−01,
−3.266407412190941e−01, −3.383295002935882e−01, −1.964237395967755e−01, +3.465429229977288e−02,
+2.500000000000001e−01, +3.518509343815957e−01, +2.939689006048397e−01, +1.026311318805893e−01,
−1.352990250365493e−01, −3.118062532466679e−01, −3.467599613305369e−01, −2.242918965856590e−01,
+2.500000000000000e−01, +2.242918965856591e−01, −6.897484482073575e−02, −3.118062532466678e−01,
−3.266407412190941e−01, −1.026311318805894e−01, +1.964237395967755e−01, +3.518509343815957e−01,
+2.500000000000001e−01, −3.465429229977282e−02, −2.939689006048397e−01, −3.383295002935882e−01,
−1.352990250365493e−01, +1.666639146194367e−01, +3.467599613305369e−01, +2.733004667504394e−01,
+2.500000000000000e−01, +1.666639146194366e−01, −1.964237395967756e−01, −3.518509343815956e−01,
−1.352990250365493e−01, +2.242918965856591e−01, +3.467599613305369e−01, +1.026311318805894e−01,
−2.500000000000001e−01, −3.383295002935882e−01, −6.897484482073574e−02, +2.733004667504394e−01,
+3.266407412190941e−01, +3.465429229977289e−02, −2.939689006048397e−01, −3.118062532466677e−01,
+2.500000000000000e−01, +1.026311318805894e−01, −2.939689006048397e−01, −2.733004667504393e−01,
```

-continued

```
+1.352990250365493e-01, +3.518509343815957e-01, +6.897484482073579e-02, -3.118062532466678e-01,
-2.500000000000001e-01, +1.666639146194366e-01, +3.467599613305369e-01, +3.465429229977293e-02,
-3.266407412190941e-01, -2.242918965856591e-01, +1.964237395967756e-01, +3.383295002935882e-01,
+2.500000000000000e-01, +3.465429229977287e-02, -3.467599613305369e-01, -1.026311318805893e-01,
+3.266407412190941e-01, +1.666639146194366e-01, -2.939689006048397e-01, -2.242918965856591e-01,
+2.500000000000001e-01, +2.733004667504393e-01, -1.964237395967756e-01, -3.118062532466678e-01,
+1.352990250365493e-01, +3.383295002935882e-01, -6.897484482073578e-02, -3.518509343815956e-01,
+2.500000000000000e-01, -3.465429229977287e-02, -3.467599613305369e-01, +1.026311318805893e-01,
+3.266407412190941e-01, -1.666639146194366e-01, -2.939689006048397e-01, +2.242918965856591e-01,
+2.500000000000001e-01, -2.733004667504393e-01, -1.964237395967756e-01, +3.118062532466678e-01,
+1.352990250365493e-01, -3.383295002935882e-01, -6.897484482073578e-02, + 3.518509343815956e-01,
+2.500000000000000e-01, -1.026311318805894e-01, -2.939689006048397e-01, +2.733004667504393e-01,
+1.352990250365493e-01, -3.518509343815957e-01, +6.897484482073579e-02, +3.118062532466678e-01,
-2.500000000000001e-01, -1.666639146194366e-01, +3.467599613305369e-01, -3.465429229977293e-02,
-3.266407412190941e-01, +2.242918965856591e-01, +1.964237395967756e-01, -3.383295002935882e-01,
+2.500000000000000e-01, -1.666639146194366e-01, -1.964237395967756e-01, +3.518509343815956e-01,
-1.352990250365493e-01, -2.242918965856591e-01, +3.467599613305369e-01, -1.026311318805894e-01,
-2.500000000000001e-01, +3.383295002935882e-01, -6.897484482073574e-02, -2.733004667504394e-01,
+3.266407412190941e-01, -3.465429229977289e-02, -2.939689006048397e-01, +3.118062532466677e-01,
+2.500000000000000e-01, -2.242918965856591e-01, -6.897484482073575e-02, +3.118062532466678e-01,
-3.266407412190941e-01, +1.026311318805894e-01, +1.964237395967755e-01, -3.518509343815957e-01,
+2.500000000000001e-01, +3.465429229977282e-02, -2.939689006048397e-01, +3.383295002935882e-01,
-1.352990250365493e-01, -1.666639146194367e-01, +3.467599613305369e-01, -2.733004667504394e-01,
+2.500000000000000e-01, -2.733004667504394e-01, +6.897484482073575e-02, +1.666639146194366e-01,
-3.266407412190941e-01, +3.383295002935882e-01, -1.964237395967755e-01, -3.465429229977288e-02,
+2.500000000000001e-01, -3.518509343815957e-01, +2.939689006048397e-01, -1.026311318805893e-01,
-1.352990250365493e-01, +3.118062532466679e-01, -3.467599613305369e-01, +2.242918965856590e-01,
+2.500000000000000e-01, -3.118062532466678e-01, +1.964237395967756e-01, -3.465429229977286e-02,
-1.352990250365493e-01, +2.733004667504394e-01, -3.467599613305369e-01, +3.383295002935882e-01,
-2.500000000000001e-01, +1.026311318805894e-01, +6.897484482073574e-02, -2.242918965856590e-01,
+3.266407412190941e-01, -3.518509343815957e-01, +2.939689006048397e-01, -1.666639146194367e-01,
+2.500000000000000e-01, -3.383295002935882e-01, +2.939689006048397e-01, -2.242918965856591e-01,
+1.352990250365493e-01, -3.465429229977286e-02, -6.897484482073579e-02, +1.666639146194366e-01,
-2.500000000000001e-01, +3.118062532466678e-01, -3.467599613305369e-01, +3.518509343815956e-01,
-3.266407412190941e-01, +2.733004667504394e-01, -1.964237395967756e-01, +1.026311318805893e-01,
+2.500000000000000e-01, -3.518509343815957e-01, +3.467599613305369e-01, -3.383295002935882e-01,
+3.266407412190941e-01, -3.118062532466678e-01, +2.939689006048397e-01, -2.733004667504394e-01,
+2.500000000000001e-01, -2.242918965856591e-01, +1.964237395967756e-01, -1.666639146194367e-01,
+1.352990250365493e-01, -1.026311318805893e-01, +6.897484482073578e-02, -3.465429229977293e-02
};
```

In accordance with the above, an efficient low complexity method is provided for quantization of envelope representation coefficients.

According to embodiments, application of a transform to the envelope representation residual coefficients enables a very low rate and low complex first stage in the VQ without sacrificing performance.

According to embodiments, selection of an outlier submode in a multimode PVQ quantizer enables efficient handling of envelope representation residual coefficient outliers. Outliers have very high or very low energy/gains or an atypical shape.

According to embodiments, selection of a regular submode in a multimode PVQ quantizer enables higher resolution coding of the most frequent/typical envelope representation residual coefficients/shapes.

According to embodiments, for enabling an efficient PVQ-search scheme, the outlier mode employs a non-split VQ while the regular non-outlier submode employs a split-VQ, with different bits/coefficient in each split segment. Further the split segments may preferably be a nonlinear sample of the transformed vector.

According to embodiments, application of an efficient dual/multi-mode PVQ-search enables a very efficient search and sub-mode selection in a multimode PVQ-based gain-shape structure.

According to embodiments, the herein disclosed methods enable efficient usage of a fractional bitspace through the use joint combination of shape indices, LSB gains and LSB of submode indications.

Figure 16:
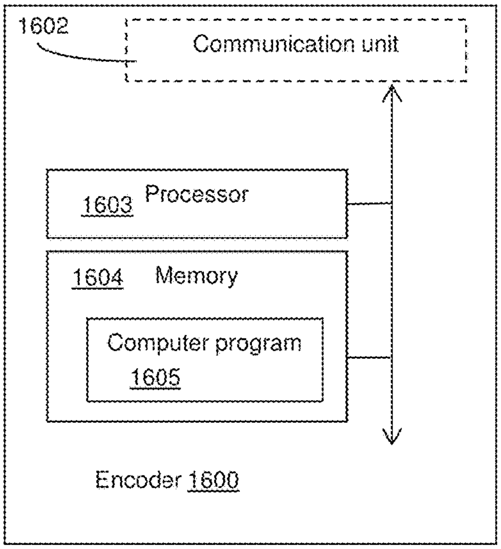
FIG. 16 shows a block diagram illustrating an example embodiment of an encoder.
Figure 17:
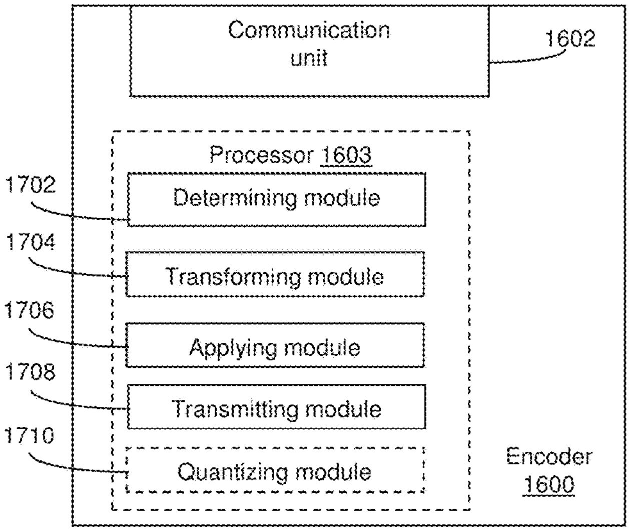
FIG. 17 shows a block diagram illustrating another example embodiment of an encoder.
Figure 18:
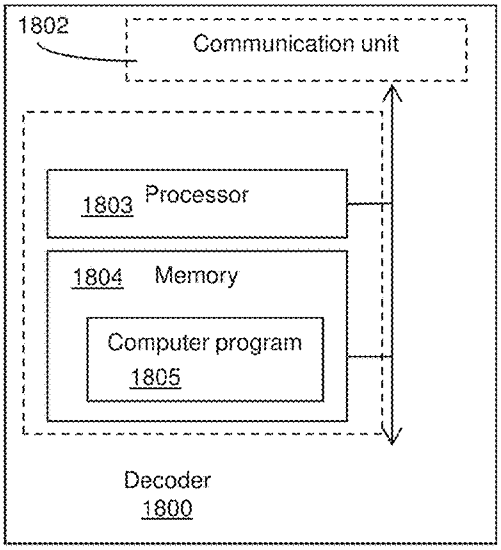
FIG. 18 shows a block diagram illustrating an example embodiment of a decoder.
Figure 19:
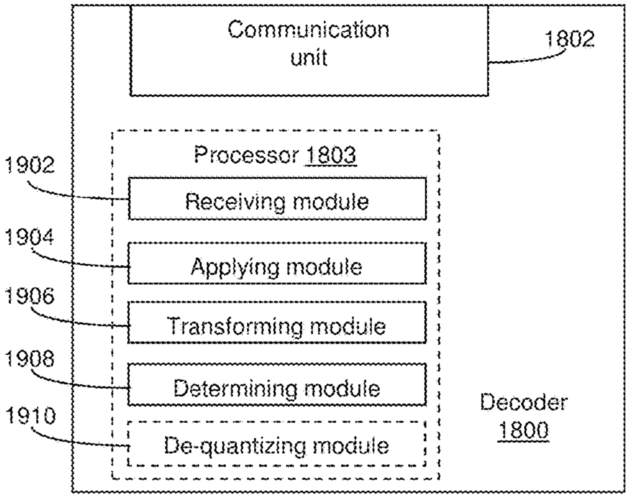
FIG. 19 shows a block diagram illustrating another example embodiment of a decoder.

To perform the methods and actions herein, an encoder 1600 and a decoder 1800 are provided. FIGS. 16-17 are block diagrams depicting the encoder 1600. FIGS. 18-19 are block diagrams depicting the decoder 1800. The encoder 1600 is configured to perform the methods described for the encoder 1600 in the embodiments described herein, while the decoder 1800 is configured to perform the methods described for the decoder 1800 in the embodiments described herein.

For the encoder, the embodiments may be implemented through one or more processors 1603 in the encoder depicted in FIG. 16 and FIG. 17, together with computer program code 1605 for performing the functions and/or method actions of the embodiments herein. The program code mentioned above may also be provided as a computer program product, for instance in the form of a data carrier carrying computer program code for performing embodiments herein when being loaded into the encoder 1600. One such carrier may be in the form of a CD ROM disc. It is however feasible with other data carriers such as a memory stick. The computer program code may furthermore be provided as pure program code on a server and downloaded to the encoder 1600. The encoder 1600 may further comprise a communication unit 1602 for wireline or wireless communication with e.g. the decoder 1800. The communication unit may be a wireline or wireless receiver and transmitter or a wireline or wireless transceiver. The encoder 1600 further comprises a memory 1604. The memory 1604 may, for example, be used to store applications or programs to perform the methods herein and/or any information used by such applications or programs. The computer program code may be downloaded in the memory 1604.

The encoder 1600 may according to the embodiment of FIG. 17 comprises a determining module 1702 for determining envelope representation residual coefficients as first compressed envelope representation coefficients subtracted from the input envelope representation coefficients, a transforming module 1704 for the envelope representation residual coefficients into a warped domain so as to obtain transformed envelope representation residual coefficients, an applying module for 1706 for applying at least one of a plurality of gain-shape coding schemes on the transformed envelope representation residual coefficients in order to achieve gain-shape coded envelope representation residual coefficients, where the plurality of gain-shape coding schemes have mutually different trade-offs in one or more of gain resolution and shape resolution for one or more of the transformed envelope representation residual coefficients, and a transmitting module 1708 for transmitting, over a communication channel to a decoder, a representation of the first compressed envelope representation coefficients, the gain-shape coded envelope representation residual coefficients, and information on the at least one applied gain-shape coding scheme. The encoder 1600 may optionally further comprise a quantizing module 1710 for quantizing the input envelope representation coefficients using a first number of bits For the decoder 1800, the embodiments herein may be implemented through one or more processors 1803 in the decoder 1800 depicted in FIG. 18 and FIG. 19, together with computer program code 1805 for performing the functions and/or method actions of the embodiments herein. The program code mentioned above may also be provided as a computer program product, for instance in the form of a data carrier carrying computer program code for performing embodiments herein when being loaded into the decoder 1800. One such carrier may be in the form of a CD ROM disc. It is however feasible with other data carriers such as a memory stick. The computer program code may furthermore be provided as pure program code on a server and downloaded to the decoder 1800. The decoder 1800 may further comprise a communication unit 1802 for wireline or wireless communication with the e.g. the encoder 1600. The communication unit may be a wireline or wireless receiver and transmitter or a transceiver. The decoder 1800 further comprises a memory 1804. The memory 1804 may, for example, be used to store applications or programs to perform the methods herein and/or any information used by such applications or programs. The computer program code may be downloaded in the memory 1804.

The decoder 1800 may according to the embodiment of FIG. 19 comprise a receiving module 1902 for receiving, over a communication channel from an encoder 1600, a representation of first compressed envelope representation coefficients, gain-shape coded envelope representation residual coefficients, and information on at least one applied gain-shape coding scheme, applied by the encoder, an applying module 1904 for applying at least one of a plurality of gain-shape decoding schemes on the received gain-shape coded envelope representation residual coefficients according to the received information on at least one applied gain-shape coding scheme, in order to achieve envelope representation residual coefficients, where the plurality of gain-shape decoding schemes have mutually different trade-offs in one or more of gain resolution and shape resolution for one or more of the gain-shape coded envelope representation residual coefficients, a transforming module 1906 for transforming the envelope representation residual coefficients from a warped domain into an envelope representation original domain so as to obtain transformed envelope representation residual coefficients, and a determining module 1908 for determining envelope representation coefficients as the transformed envelope representation residual coefficients added with the received first compressed envelope representation coefficients. The decoder 1800 may optionally further comprise a de-quantizing module 1910 for de-quantizing the quantized envelope representation coefficients using a first number of bits corresponding to the number of bits used for quantizing envelope representation coefficients at a quantizer of the encoder.

As will be readily understood by those familiar with communications design, functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them.

From the above it may be seen that the embodiments may further comprise a computer program product, comprising instructions which, when executed on at least one processor, e.g. the processors 1603 or 1803, cause the at least one processor to carry out any of the methods described. Also, some embodiments may, as described above, further comprise a carrier containing said computer program, wherein the carrier is one of an electronic signal, optical signal, radio signal, or computer readable storage medium.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a dashed line generally signifies that the feature within the dashed line is optional.

EXAMPLE EMBODIMENTS

1. A method performed by an encoder (1600) of a communication system (100) for handling input envelope representation coefficients, the method comprising: determining (204) envelope representation residual coefficients as first compressed envelope representation coefficients subtracted from the input envelope representation coefficients; transforming (206) the envelope representation residual coefficients into a warped domain so as to obtain transformed envelope representation residual coefficients; applying (208) at least one of a plurality of gain-shape coding schemes on the transformed envelope representation residual coefficients in order to achieve gain-shape coded envelope representation residual coefficients, where the plurality of gain-shape coding schemes have mutually different trade-offs in one or more of gain resolution and shape resolution for one or more of the transformed envelope representation residual coefficients; and transmitting (210), over a communication channel to a decoder, a representation of the first compressed envelope representation coefficients, the gain-shape coded envelope representation residual coefficients, and information on the at least one applied gain-shape coding scheme.

The steps of handling the envelope representation residual coefficients has an advantage in that it provides a computationally efficient handling that at the same time results in an efficient compression of the envelope representation residual coefficients. Consequently, the method results in a computation efficient and compression efficient handling of the envelope representation coefficients.

The envelope representation coefficients may also be called an envelope representation coefficient vector. Similarly, the envelope representation residual coefficients may be called an envelope representation residual coefficient vector. The warped domain may be a warped quantization domain. The application of one of the plurality of gain-shape coding schemes may be performed per envelope representation residual coefficient basis. For example, a first scheme may be applied for a first group of envelope representation residual coefficients and a second scheme may be applied for a second group of envelope representation residual coefficients.

The wording "resolution" above signifies number of bits used for a coefficient. In other words, gain resolution signifies number of bits used for defining gain for a coefficient and shape resolution signifies number of bits used for defining shape for a coefficient.

2. Method according to embodiment 1, further comprising: quantizing (202) the input envelope representation coefficients using a first number of bits, and wherein the determining (204) of envelope representation residual coefficients comprises subtracting the quantized envelope representation coefficients from the input envelope representation coefficients, and the transmitted first compressed envelope representation coefficients are the quantized envelope representation coefficients.

The above method has the advantage that it enables a low first number of bits used in the quantizing step.

3. Method according to any of the preceding embodiments, wherein the applying (208) at least of one of a plurality of gain-shape coding schemes on the transformed envelope representation residual coefficients comprises selectively applying the at least one of the plurality of gain-shape coding schemes.

By selectively applying a gain-shape coding scheme the encoder can select the gain-shape coding scheme that is best suited for the individual coefficient.

4. Method according to embodiment 3, wherein the selection in the selectively applying (208) of the at least one of the plurality of gain-shape coding schemes is performed by a combination of a PVQ shape projection and a shape fine search to reach a first PVQ pyramid code point over available dimensions on a per envelope representation residual coefficient basis.

The above embodiment has the advantage that it lowers average computational complexity.

5. Method according to embodiment 3, wherein the selection in the selectively applying (208) of the at least one of the plurality of gain-shape coding schemes is performed by a combination of a PVQ shape projection and a shape fine search to reach a first PVQ pyramid codepoint over available dimensions followed by another shape fine search to reach a second PVQ pyramid code point within a restricted set of dimensions.

6. Method according to any of the preceding embodiments, wherein at least some of the plurality of gain-shape coding schemes use mutually different bit resolutions for different subsets of envelope representation residual coefficients.

7. Method according to any of the preceding embodiments, wherein the input envelope representation coefficients are mean removed envelope representation coefficients.

8. Method according to any of the preceding embodiments, wherein the applying (208) at least of one of a plurality of gain-shape coding schemes on the transformed envelope representation residual coefficients comprises applying a two-stage VQ.

9. Method according to embodiment 8, wherein the two-stage VQ comprises a first stage split VQ and a second stage PVQ.

10. Method according to embodiment 9, wherein the split VQ employs two off-line trained stochastic codebooks.

11. Method according to embodiment 10, wherein the two off-line trained stochastic codebooks are not larger than half the size of codebooks used during the second stage PVQ.

That is, the codebooks of the first stage split VQ might, in a quantifiable way, be of much lower size than the codebooks used during the second stage PVQ.

12. Method according to embodiment 9, wherein the PVQ employs application of a DCT-rotation matrix, application of a shape search, application of adjustment gain and submode quantization, and application of shape enumeration.

13. Method according to embodiment 12, wherein the two-stage VQ employs a total of whole 38 bits.

14. Method according to any of the preceding claims, wherein an integer bit space for gain-shape multiplexing is used by sectioning a joint shape codeword into several subsections, and where a specific subsection indicates submode least significant bit, a gain least significant bit, or an additional shape codeword.

15. A method performed by a decoder (1800) of a communication system (100) for handling envelope representation residual coefficients, the method comprising: receiving (301), over a communication channel from an encoder (1600), a representation of first compressed envelope representation coefficients, gain-shape coded envelope representation residual coefficients, and information on at least one applied gain-shape coding scheme, applied by the encoder; applying (304) at least one of a plurality of gain-shape decoding schemes on the received gain-shape coded envelope representation residual coefficients according to the received information on at least one applied gain-shape coding scheme, in order to achieve envelope representation residual coefficients, where the plurality of gain-shape decoding schemes have mutually different trade-offs in one or more of gain resolution and shape resolution for one or more of the gain-shape coded envelope representation residual coefficients; transforming (306) the envelope representation residual coefficients from a warped domain into an envelope representation original domain so as to obtain transformed envelope representation residual coefficients, and determining (308) envelope representation coefficients as the transformed envelope representation residual coefficients added with the received first compressed envelope representation coefficients.

To transform the coefficients from a warped domain into an envelope representation coefficient original domain signifies that the coefficients are warped back to the envelope representation residual coefficient domain in which they were before they were transformed into the warped domain at the encoder.

16. Method according to embodiment 15, wherein the received first compressed envelope representation coefficients are quantized envelope representation coefficients, the method further comprising: de-quantizing (307) the quantized envelope representation coefficients using a first number of bits corresponding to the number of bits used for quantizing envelope representation coefficients at a quantizer of the encoder, and wherein the envelope representation coefficients are determined (308) as the transformed envelope representation residual coefficients added with the de-quantized envelope representation coefficients.

17. Method according to claim embodiment 15, further comprising: receiving (S302), over the communication channel and from the encoder, the first number of bits used at a quantizer of the encoder.

The first number of bits may be predetermined between encoder and decoder. If not, information of the first number of bits is sent from the encoder to the decoder.

18. Method according to any of embodiments 15-17, wherein the input envelope representation coefficients are mean removed envelope representation coefficients.

19. Method according to any of embodiments 15-18, wherein the applying (304) at least of one of a plurality of gain-shape decoding schemes on the transformed envelope representation residual coefficients comprises applying an inverse two-stage VQ.

20. Method according to embodiment 19, wherein the inverse two-stage VQ comprises a first stage inverse PVQ and a second stage inverse split VQ.

21. Method according to embodiment 20, wherein the inverse PVQ employs application of submode and gain decoding, application of shape de-enumeration and normalization, application of adjustment gain, and application of an IDCT-rotation matrix.

22. Method according to any of embodiments 15 to 21, wherein a received jointly coded shape codeword is decomposed to indicate submode least significant bit, or a gain least significant bit, or an additional shape codeword.

23. Method according to any of the preceding embodiments, wherein the representation is defined by indices to codebooks.

24. Method according to any of the preceding embodiments, wherein the representation is defined by the first compressed envelope representation coefficients, the gain-shape coded envelope representation residual coefficients, and the information on at least one applied gain-shape coding scheme themselves.

25. Method according to any of the preceding embodiments, wherein the envelope representation coefficients represent scale factors.

26. Method according to any of the preceding embodiments, wherein the envelope representation coefficients represent an encoded audio waveform.

27. An encoder (1600) of a communication system (100) for handling input envelope representation coefficients, the encoder being configured to perform a method according to any of embodiments 1 to 14 and 23 to 26.

28. A decoder (1800) of a communication system (100) for handling envelope representation residual coefficients, the decoder being configured to perform a method according to any of embodiments 15 to 26.

| Abbreviations | |
|---|---|
| LSF | Line Spectral Frequencies |
| LSP | Line Spectral Pairs |
| ISP | Immittance Spectral Pairs |
| ISF | Immittance Spectral Frequencies |
| VQ | Vector Quantizer |
| MS-SVQ | MultiStage Split Vector Quantizer |
| PVQ | Pyramid VQ |
| NPVQ | Number of PVQ indices |
| MPVQ | sign Modular PVQ enumeration scheme |
| MSE | Mean Square Error |
| RMS | Root Mean Square |
| WMSE | Weighted MSE |
| LSB | Least Significant Bit |
| MSB | Most Significant Bit |
| DCT | Discrete Cosine Transform |
| IDCT | Inverse Discrete Cosine Transform |
| RDCT | Rotated (ACF based) DCT |
| LOG2 | Base 2 logarithm |
| SD | Spectral Distortion |
| EVS | Enhanced Voice Service |
| WB | Wideband (typically an audio signal sampled at 16 kHz) |
| WMOPS | Weighted Million Operations per Second |
| WC-WMOPS | Worst Case WMOPS |
| AMR-WB | Adaptive Multi-Rate Wide Band |
| DSP | Digital Signal Processor |
| TCQ | Trellis Codes Quantization |
| MUX | MUltipleXor (multiplexing unit) |
| DEMUX | DE-MUltipleXor (de-multplexing unit) |
| ARE | Arithmetic/Range Encoder |
| ARD | Arithmetic/Range Decoder |

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An audio encoder comprising:

processing circuitry; and memory storing code for configuring the audio encoder to perform a process comprising:

quantizing input envelope representation coefficients to produce quantized input envelope representation coefficients;

determining residual coefficients by subtracting the quantized input envelope representation coefficients from the input envelope representation coefficients;

transforming the residual coefficients to obtain transformed residual coefficients;

applying one of a plurality of gain-shape coding schemes on the transformed residual coefficients in order to achieve gain-shape coded residual coefficients, where the plurality of gain-shape coding schemes have mutually different trade-offs in one or more of gain resolution and shape resolution for one or more of the transformed residual coefficients; and providing a representation of the quantized input envelope representation coefficients, the gain-shape coded residual coefficients, and information on the applied gain-shape coding scheme for transmission to an audio decoder.

2. The audio encoder of claim 1, wherein transforming the residual coefficients comprises applying a Hadamard transform, a rotated DCT transform, or a DCT transform.

3. The audio encoder of claim 1, wherein the applying the gain-shape coding scheme on the transformed residual coefficients comprises selectively applying the at least one of the plurality of gain-shape coding schemes.

4. The audio encoder of claim 3, wherein the selection in the selectively applying of the at least one of the plurality of gain-shape coding schemes is performed by a combination of a PVQ shape projection and a shape fine search to reach a first PVQ pyramid code point over available dimensions on a per residual coefficient basis.

5. The audio encoder of claim 3, wherein the selection in the selectively applying of the at least one of the plurality of gain-shape coding schemes is performed by a combination of a Pyramid Vector Quantization (PVQ) shape projection and a shape fine search to reach a first PVQ pyramid codepoint over available dimensions followed by another shape fine search to reach a second PVQ pyramid code point within a restricted set of dimensions.

6. The audio encoder of claim 1, wherein at least some of the plurality of gain-shape coding schemes use mutually different bit resolutions for different subsets of residual coefficients.

7. The audio encoder of claim 1, wherein the input envelope representation coefficients are mean removed envelope representation coefficients.

8. The audio encoder of claim 1, wherein the method further comprises applying a two-stage Vector Quantization (VQ), wherein the two-stage VQ comprises a first stage split VQ and a second stage Pyramid VQ (PVQ).

9. The audio encoder of claim 8, wherein quantizing the input envelope representation coefficients comprises applying the first stage split VQ, and applying at least of one of a plurality of gain-shape coding schemes on the transformed envelope representation residual coefficients comprises applying the second stage PVQ.

10. The audio encoder of claim 9, wherein the split VQ employs two off-line trained stochastic codebooks that are not larger than half the size of codebooks used during the second stage PVQ.

11. The audio encoder of claim 8, wherein the second stage PVQ employs application of a DCT-rotation matrix, application of a shape search, application of adjustment gain and submode quantization, and application of shape enumeration.

12. The audio encoder of claim 1, wherein the envelope representation is defined by the quantized input envelope representation coefficients, the gain-shape coded residual coefficients, and the information on at least one applied gain-shape coding scheme themselves.

13. The audio encoder of claim 1, wherein the envelope representation coefficients represent scale factors.

14. The audio encoder of claim 1, wherein the envelope representation coefficients represent an audio waveform.

15. The audio encoder of claim 1, wherein transforming the residual coefficients comprises applying a DCT transform.

16. An audio decoder comprising:
processing circuitry; and
memory storing code for configuring the audio decoder to perform a process comprising:
receiving a representation of quantized envelope representation coefficients (QERCs), gain-shape coded residual coefficients, and information on an applied gain-shape coding scheme;
applying on the received gain-shape coded residual coefficients one of a plurality of gain-shape decoding schemes according to the received information on the applied gain-shape coding scheme in order to obtain envelope representation residual coefficients, wherein the plurality of gain-shape decoding schemes have mutually different trade-offs in one or more of gain resolution and shape resolution for one or more of the gain-shape coded residual coefficients;
transforming the obtained envelope representation residual coefficients, thereby obtaining transformed envelope representation residual coefficients; and
obtaining envelope representation coefficients based on the transformed envelope representation residual coefficients and representation of the QERCs.

17. The audio decoder of claim 16, wherein the method further comprises using a first number of bits to produce de-quantized envelope representation coefficients, and obtaining the envelope representation coefficients comprises adding the transformed residual coefficients with the de-quantized envelope representation coefficients.

18. The audio decoder of claim 17, wherein the method further comprises receiving the first number of bits.

19. The audio decoder of claim 16, wherein applying one of the plurality of gain-shape decoding schemes on the transformed residual coefficients comprises applying an inverse two-stage Vector Quantization (VQ).

20. The audio decoder of claim 19, wherein the inverse two-stage VQ comprises an inverse Pyramid VQ (PVQ) and an inverse split VQ.

21. The audio decoder of claim 20, wherein the inverse PVQ employs application of submode and gain decoding, application of shape de-enumeration and normalization, application of adjustment gain, and application of an IDCT-rotation matrix.

22. The audio decoder of claim 16, wherein a received jointly coded shape codeword is decomposed to indicate submode least significant bit, or a gain least significant bit, or an additional shape codeword.

23. The audio decoder of claim 16, wherein the envelope representation coefficients are defined by indices to codebooks.

24. The audio decoder of claim 16, wherein the envelope representation coefficients is defined by the QERCs, the gain-shape coded residual coefficients, and the information on at least one applied gain-shape coding scheme themselves.

25. The audio decoder of claim 16, wherein the envelope representation coefficients represent scale factors.

* * * * *